United States Patent
Azarian et al.

(10) Patent No.: US 6,238,467 B1
(45) Date of Patent: May 29, 2001

(54) RIGID MULTI-FUNCTIONAL FILTER ASSEMBLY

(75) Inventors: Michael H. Azarian, Wallingford, PA (US); Jacob Maniyatte, Elkton, MD (US)

(73) Assignee: Gore Enterprise Holdings, Inc., Newark, DE (US)

(*) Notice: Subject to any disclaimer, the term of this patent is extended or adjusted under 35 U.S.C. 154(b) by 0 days.

(21) Appl. No.: 09/405,495

(22) Filed: Sep. 24, 1999

(51) Int. Cl.⁷ .................................................. B01D 53/04
(52) U.S. Cl. ............................ 96/135; 96/139; 96/147; 96/152; 96/153; 55/385.6; 55/502; 55/519; 360/97.02
(58) Field of Search ..................... 96/134, 135, 137, 96/139, 147, 152–154; 55/385.1, 385.6, 502, 515, 519; 360/97.02–97.04

(56) References Cited

U.S. PATENT DOCUMENTS

| | | | |
|---|---|---|---|
| 1,737,532 | * 11/1929 | Allen | 96/152 |
| 3,067,560 | * 12/1962 | Parker | 96/152 |
| 3,090,490 | * 5/1963 | Yocum | 96/134 X |
| 3,953,566 | 4/1976 | Gore | 264/288 |
| 4,614,528 | * 9/1986 | Lennen | 96/147 |
| 4,633,349 | 12/1986 | Beck et al. | 360/97 |
| 4,668,258 | * 5/1987 | Steer | 96/135 X |
| 4,684,510 | * 8/1987 | Harkins | 96/135 X |
| 4,830,643 | 5/1989 | Sassa et al. | 55/316 |
| 4,857,087 | 8/1989 | Bolton et al. | 55/385.6 |
| 4,862,730 | 9/1989 | Crosby | 73/38 |
| 4,863,499 | 9/1989 | Osendorf | 55/316 |
| 4,897,095 | * 1/1990 | Bedi et al. | 96/135 |
| 4,985,296 | 1/1991 | Mortimer, Jr. | 428/220 |
| 5,030,260 | 7/1991 | Beck et al. | 55/316 |
| 5,124,856 | 6/1992 | Brown et al. | 360/97.03 |
| 5,288,298 | * 2/1994 | Aston | 96/135 |
| 5,406,431 | 4/1995 | Beecroft | 360/97.02 |
| 5,417,743 | 5/1995 | Dauber | 96/13 |
| 5,423,903 | * 6/1995 | Schmitz et al. | 96/134 |
| 5,447,695 | 9/1995 | Brown et al. | 422/171 |
| 5,462,569 | * 10/1995 | Benjamin | 55/385.6 |
| 5,500,038 | 3/1996 | Dauber et al. | 96/135 |
| 5,502,533 | * 3/1996 | Biegler | 96/135 X |
| 5,538,545 | 7/1996 | Dauber et al. | 96/153 |
| 5,573,562 | * 11/1996 | Schauwecker et al. | 55/385.6 X |
| 5,593,482 | 1/1997 | Dauber et al. | 96/135 |
| 5,734,521 | * 3/1998 | Fukudome et al. | 55/385.6 X |
| 5,814,405 | 9/1998 | Branca et al. | 428/311.51 |
| 5,869,009 | * 2/1999 | Bellefeuille et al. | 96/135 X |
| 5,876,487 | * 3/1999 | Dahlgren et al. | 96/135 X |
| 5,997,618 | * 12/1999 | Schneider et al. | 96/135 |
| 6,010,557 | * 1/2000 | Smoliar et al. | 96/135 X |

* cited by examiner

Primary Examiner—Robert H. Spitzer
(74) Attorney, Agent, or Firm—Carol A. Lewis White

(57) ABSTRACT

A unitary rigid filter that performs multiple contamination control functions within an enclosure for sensitive equipment (e.g., disk drives). The filter incorporates recirculation and adsorbent filtration, along with optional inlet and diffusion functions in a unique rigid filter construction.

54 Claims, 19 Drawing Sheets

RIGID MULTI-FUNCTIONAL FILTER ASSEMBLY

FIELD OF THE INVENTION

The invention relates to a device for filtering particulates and vapor phase contaminants from a confined environment such as electronic or optical devices susceptible to contamination (e.g., computer disk drives).

BACKGROUND OF THE INVENTION

Many enclosures that contain sensitive instrumentation must maintain very clean environments in order to operate properly. Examples include the following: enclosures with sensitive optical surfaces, or electronic connections that are sensitive to particulates and gaseous contaminants which can interfere with mechanical, optical, or electrical operation; data recording devices, such as computer hard disk drives that are sensitive to particles, organic vapors, and corrosive vapors; enclosures for processing, transport or storage of thin films and semiconductor wafers; and electronic control boxes such as those used in automobiles and industrial applications that can be sensitive to particles, moisture buildup, and corrosion as well as contamination from fluids and vapors. Contamination in such enclosures originates from both inside and outside the enclosures. For example, in computer hard drives, damage may result from external contaminants as well as from particles and outgassing generated from internal sources. The terms "hard drives" or "hard disk drives" or "disk drives" or "drives" will be used herein for convenience and are understood to include any of the enclosures mentioned above.

One serious contamination-related failure mechanism in computer disk drives is static friction or "stiction". Stiction results from the increased adhesion of a drive head to a disk while the disk is stationary plus increased viscous drag parallel to the head-disk interface. Newer high density disks are more sensitive to contamination-caused stiction because they are smoother and only thin layers of lubricants are present. Contaminants on the disk change the surface energy and the adhesive forces between the head and disk, which cause stiction. Also, vapors that condense in the gap between the head and disk can cause stiction. In addition to increasing power requirements for spinning up the drive, stiction forces can cause permanent mechanical deformation of the head suspension and gimbal assemblies. The latter have become extremely sensitive to small forces with the introduction of smaller air bearing sliders with lower applied loads, using thinner structural elements in the suspension and gimbal to maintain slider flying heights and attitudes with tremendous precision. Further exacerbating these effects are the newer lower energy, lower torque motors being used in smaller disk drives for portable computers.

Condensation of volatile organic contaminants (VOCs) onto magnetic head and disk surfaces will increase the physical head-medium separation, which will result in signal loss and increased data errors. This is increasingly true as linear bit density continues to rise at a breakneck pace. Accumulation of heavy VOCs on the critical air bearing surfaces of the head slider, through transfer from the much larger disk surface, can cause destabilization of the flying dynamics of the slider as well as significant signal losses. Interaction of VOCs and disk lubricant can lead to chemical degradation of the lubricant, especially during instances of head-disk contact and the accompanying elevated temperatures. This can lead to build-up on the disk surface of viscous, high molecular weight reaction products which are unable to replenish localized regions of lubricant depletion. Other degradation products may be volatile and permanently escape the head-disk interface. These processes can eventually result in elevated wear of head or disk surfaces, increased stiction, higher error rates, and ultimately reduced lifetime for the drive.

Acid gases, which are widely present in pollution and smog as well as industrial environments, can have especially harmful effects on drive reliability if allowed to circulate inside the drive. These compounds will adsorb onto head and disk surfaces and corrode exposed metallic layers via galvanic reaction in the presence of water. They can also be transported by moisture through pinholes in protective coatings on the head and disk. Corrosion typically results in loss of magnetic properties, as well as accumulation of reaction products on critical surfaces.

Another serious contamination-related failure mechanism in computer disk drives is head crashes. Head crashes can occur when particles get into the head disk interface. Newer high density drives have 30 nanometer or less flying heights or spacing between the head and disk during operation and typically have disks rotating 5400 revolutions per minute or greater. Even submicron-sized particles can be a problem, causing the head to crash into the particle or the disk after flying over a particle, bringing the drive to an abrupt failure mode. Particles which do not cause a head crash may still adversely affect data integrity and mechanical reliability of a drive. Small, hard inorganic particles can cause wear of a head or disk, which may result in permanent signal loss, degradation of protective coatings, or further debris generation. Wear of carbon overcoats on the head or disk can accelerate corrosion of sensitive layers through the action of moisture, acid gas contaminants, and elevated interface temperatures. Plowing of small hard particles into the disk surface can create scratches, asperities, or pile-ups of disk material. Current magnetic head technologies, employing magnetoresistive (MR) elements for sensing of magnetic flux emanating from the disk, are highly sensitive to transient temperature excursions as caused by interaction of the head with asperities or adhered particles on the rapidly moving disk. The resulting change in resistance of the MR element may be misinterpreted as magnetic signal, causing data errors. This phenomenon is well known in the industry and is referred to as a thermal asperity.

In addition, disk drives must be protected against a large number of contaminants in the surrounding environment that can penetrate the drive. This is true for drives used in small to medium sized computer systems which may not be used in the typical data processing environment and is especially true in drives that are removable and portable to any environment such as disk drives that are used in laptop computers or in Personal Computer Memory Card International Association (PCMCIA) slots.

Filtration devices to keep particles from entering these enclosures are well known. They may consist of a filtration media held in place by a housing of polycarbonate, acrylonitrile butadiene styrene (ABS), or some other material; or they may consist of a filtration media in the form of a self-adhesive disk utilizing a layer or layers of pressure sensitive adhesive. These devices are mounted and sealed over a vent hole in the enclosure to filter particulates from the air entering the drive. Filtration performance depends not only on the filter having a high filtration efficiency but also on having a low resistance to air flow so that unfiltered air does not leak into the enclosure through a gasket or seam instead of entering through the filter. Such filters work well for particulates of external origin, but do not address the problems from vapor phase contaminants.

Combination adsorbent breather filters to keep particulates and vapors from entering enclosures are also well known. These can be made by filling a cartridge of polycarbonate, ABS, or similar material with adsorbent and securing filter media on both ends of the cartridge. Examples of such filters are described in U.S. Pat. No. 4,863,499 issued to Osendorf (an anti-diffusion chemical breather assembly for disk drives with filter media having a layer impregnated with activated charcoal granules); U.S. Pat. No. 5,030,260 issued to Beck et al. (a disk drive breather filter including an assembly with an extended diffusion path); U.S. Pat. No. 5,124,856 issued to Brown et al. (a unitary filter medium with impregnated activated carbon filters to protect against organic and corrosive pollutants); and U.S. Pat. No. 5,447,695 issued to Brown et al. (Chemical Breather Filter Assembly). Unfortunately, many of these designs are too large and take up too much space in today's miniaturized drives. They again filter only incoming air of particles and mainly incoming air of vaporous contaminants, although some internal air can also be cleaned from internally generated vaporous contaminants since the filters are inside the drive and these contaminants will diffuse into the adsorbent sections of the filters. None of these filters address cleaning the air of internal particles.

A second combination adsorbent breather filter is also well known that encapsulates the adsorbent material such as an impregnated activated carbon polytetrafluoroethylene (PTFE) composite layer between two layers of filter media and is applied over a hole in the enclosure with a layer of pressure sensitive adhesive. These filters work well and are of a size that can be used in today's small drives but are typically designed to filter air coming into the drive. Thus, the adsorbent is typically primarily desired to adsorb both organic and corrosive vapors from the outside environment and will filter particulates only from air coming into or leaving the drive. Internally generated vapors can be adsorbed by these filters, but often times they are used in conjunction with another internal adsorbent so they can be smaller in size; therefore, such filters do not contain enough adsorbent to adequately adsorb all the internally generated contaminants. Again, particles are also generated inside the drive and are not typically captured by these filters.

A diffusion tube can be included with either the particulate breather filter or an adsorbent breather filter as described in U.S. Pat. No. 5,417,743 by Dauber. Diffusion tubes provide additional protection against vaporous contaminants (including moisture) entering the drive through the breather opening by providing a diffusion barrier in the form of the diffusion tube which creates a tortuous or a longer path for air to travel before entering the drive enclosure. Diffusion tubes reduce the number of contaminants reaching the interior of the enclosure (and/or the adsorbent depending on the location of the filter) and increase the diffusion time constants or time required to reach chemical equilibrium with the environment. As used herein, for convenience, the term "diffusion tube" may refer to either a conventional tortuous path or it may refer to a non-tortuous cavity into which incoming air passes before entering the filter.

Internal particulate filters, or recirculation filters, are also well known. These are typically pieces of filter media, such as expanded PTFE membrane laminated to a polyester nonwoven backing material, or "pillow-shaped" filters containing electret (i.e., electrostatic) filter media. They are pressure fit into slots or "C" channels and are placed in the active air stream such as near the rotating disks in a computer hard disk drive or in front of a fan in electronic control cabinets, etc. Alternatively, the recirculation filter media can be framed in a plastic frame. These filters work well for removal of internally generated particles but do not address the problem of vapor phase contaminants, nor do they provide ultimate protection from external particles entering the drive.

Internal adsorbent filters are also well known. One example is described in U.S. Pat. No. 4,830,643 issued to Sassa et al. This patent teaches an adsorbent filter where a powdered, granular or beaded adsorbent or adsorbent mixture is encapsulated in an outer expanded PTFE tube. This filter is manufactured by W. L. Gore & Associates, Inc., Elkton, Md., and is commercially available under the trademark GORE-SORBER® module. While this is highly effective at collecting vapor phase contaminants, it is currently only available in large and medium sizes like filter volumes down to about 3 cc. In its present form, this filter is incapable of fully addressing the growing needs for even smaller and more compact adsorbent filters, nor is it designed to filter the internal air of particulate contamination. A second well known internal adsorbent assembly incorporates a layer of adsorbent, such as activated carbon/PTFE composite, between an encapsulating filter layer and layer of pressure sensitive adhesive that helps encapsulate the adsorbent as well as provides a means of mounting the adsorbent assembly on an interior wall in the enclosure. Such a filter is described in U.S. Pat. No. 5,593,482 issued to Dauber et al. Again neither of these filters addresses particulate contaminants. A third internal adsorbent assembly incorporates a layer of adsorbent such as activated carbon/PTFE composite between two layers of filter media or is alternately wrapped in a layer of filter media and can be installed between slots or "C" channels much the way a recirculation filter is installed but without much real airflow through the filter. Such a filter is described in U.S. Pat. No. 5,500,038 issued to Dauber et al., and, as with the other filters mentioned, this construction does not provide significant particle capturing capability.

As stated above, all of these internal adsorbent filters work well at adsorbing vapor phase contaminants, but they do not filter particulates very well. They can collect particles by some impaction of particles onto the filter (i.e., by having the larger particles impacting or colliding with the adsorbent filter as particle-laden air speeds around the filters) or by diffusion of particles onto the filter. However, these filters do not perform nearly as well as standard recirculation filters that work by a combination of sieving (mechanically capturing particles too large to pass through the pore structure of the filter), impaction (capturing particles too large to follow the bending air streams around filters or the fibers of the filter), interception (capturing particles that tend to follow the air streams, but are large enough to still intercept a filter fiber or in other words those particles with a diameter equal to or less than the distance between the fiber and the air stream line), and diffusion (capturing smaller particles buffeted about by air molecules in a random pattern and coming into contact with a filter fiber to become collected).

A commercially available adsorbent recirculation filter, available from The Donaldson Company, incorporates activated carbon beads glued to a nonwoven carrier that is sandwiched between two layers of electret filter material and two layers of plastic support screen. This filter provides some adsorbent protection at the sacrifice of some internal particle filtration effectiveness, as this construction appears to increase resistance to air flow through the filter relative to a conventional recirculation filter. The adsorbent capability is limited, however, due to, for example, the constraints of the filter size and the blockage of adsorbent surface area by the glue holding the carbon to the carrier. Moreover, this filter does not filter particles from air entering the drive.

Another issue in today's drives is contamination due to corrosive ions such as chlorine and sulfur dioxide. To adsorb these compounds the adsorbent is typically treated with a salt to chemisorb the contaminants. When the filters described in the preceding paragraph were washed in deionized water, large amounts of these salts were released, making it unacceptable to today's sensitive disk drive environments. An alternative washable adsorbent recirculation filter is described in U.S. Pat. No. 5,538,545 issued to Dauber et al., wherein expanded PTFE membranes or other hydrophobic materials are used to encapsulate the adsorbent. However, these filters still do not filter air as it comes into the drive before it has had a chance to deposit particles and do damage to the drive.

Combinations of several filters having different functions in a single drive have been taught. For example, U.S. Pat. No. 5,406,431, to Beecroft, describes a filter system for a disk drive that includes an adsorbent breather and recirculation filter in specifically identified locations within the drive. Also, U.S. Pat. No. 4,633,349, by Beck et al., teaches a disk drive filter assembly comprising a dual media drum type filter element in a recirculating filter assembly that surrounds a breather filter. Further, U.S. Pat. No. 4,857,087, to Bolton et al., teaches incorporating a breather filter in a recirculation filter housing, but has significantly more parts and incorporates a third filter element complete with housings, apertures, and gaskets to accomplish this inclusion. The combinations described in these patents either locate the filter components in separate regions of the disk drive or incorporate space-consuming fixtures to orient the component parts within the drives.

As disk drives have become smaller and the prices have declined, there has been a push for simplification and the reduction in the number of parts in a drive to reduce cost and improve performance. Also, as the drives continue to increase in recording data density and capacity, they continue to become more sensitive to particulate and vaporous contamination, such that the existing filtration means often do not meet these ever more demanding filtration requirements.

Accordingly, a primary purpose of the present invention is to provide an improved rigid multiple function part that can filter both incoming (i.e., external to the enclosure) air and internal recirculating air of particulates.

A further purpose of the present invention is to provide an improved rigid multiple function part that can filter both incoming and internal recirculating air of both particulates and vapor phase contaminants.

A further purpose of the present invention is to provide a rigid multiple function part, as described above, which further incorporates a diffusion tube.

A further purpose of the present invention is to provide a rigid multiple function part, as described above, which further incorporates a gasket to help to seal the disk drive housing.

SUMMARY OF THE INVENTION

The present invention is a unitary rigid filter that performs multiple contamination control functions within a disk drive or other confined environment susceptible to contamination. The filter incorporates a recirculation filter, an adsorbent filter, and preferably an inlet, or breather, filter. For example, the filter is capable of providing active chemical filtration (i.e., air is directed through the adsorbent component as it enters the disk drive through the breather hole or air is directed through the adsorbent component as air is recirculated around the drive) or passive chemical filtration (i.e., air within the disk drive passes along the adsorbent component which is adjacent the normal air flow path in the drive, with no air being specifically directed through a cross-section of the adsorbent) or some combination of the two. Further, a diffusion tube could optionally be included on or in the filter, or alternatively in a location on the drive housing where the filter is positioned, to provide a combined multi-functional or "all-in-one" filter assembly which has all of the filtration components which are typically contained in a conventional disk drive. Still further, the multi-functional filter may optionally incorporate a gasket to, for example, enhance performance of the filter and/or facilitate assembly of the filter in the finished disk drives.

As used herein, the term "rigid" when used to describe the filter shall mean that the structural frame has a flexural modulus of at least 500 psi (ASTM D-790). In a preferred embodiment, the structural frame has a flexural modulus of at least 15,000 psi, and even more preferably at least 35,000 psi.

The present invention provides an improved filter which can consolidate adsorbent recirculation, particulate recirculation, and optional breather and adsorbent breather/inlet filtration functions previously performed by two, three, or more filters into a single filter that functions well. In addition, the filter is easy to install and extremely versatile. The rigid filter can furthermore be made to be clean and cleanable. The term "clean" as used herein shall mean: low in outgassing (i.e., less than 100 parts per million by weight as measured by dynamic headspace sampling at 85° C. and gas chromatography/mass spectroscopy detection), low in silicone compounds (i.e., less than 0.02 $\mu g/cm^2$ as measured by Fourier transform infrared spectroscopy of a liquid hexane extract), low in extractable ions (i.e., less than 0.05 $\mu g/cm^2$ as measured by ion chromatography of a deionized water extract), and low in nonvolatile residues (i.e., less than 10 $\mu g/cm^2$ as measured by weighing of an evaporated hexane extract), as well as low in particulation (i.e., less than 100 particles/$cm^2$ of size 1 $\mu m$ or above as measured by a laser particle counter of a deionized water extract).

In a first preferred embodiment, the filter comprises a rigid frame comprising a first open end, a second open end and at least one side, or wall, wherein the frame defines a chamber having a volume between the first and second open ends. The first and second open ends have particulate filtration media mounted over the openings to enclose the chamber, and adsorbent material is held within the chamber. An extension of the rigid frame, either contiguous with the frame or as a separate attached piece, having an opening therein is located adjacent to the chamber, preferably in a substantially planar orientation with either the first or second open end of the rigid frame, the opening also having a filter media covering the opening. In use within a disk drive, such a filter may be mounted within the disk drive so that the ends of the rigid filter are located in the path of recirculating air to be filtered. Recirculating air passes through the adsorbent chamber to provide adsorbent filtration and through the adjacent filter media mounted on the frame extension to provide particulate filtration of the recirculating air.

Alternative preferred configurations of the multi-functional rigid filter are described and shown in more detail herein.

In a further preferred embodiment of the invention, the rigid filter may include an optional inlet hole located in a side or wall of the adsorbent-containing chamber which is to be mounted to the disk drive. The inlet is configured to line up with a breather hole in the disk drive housing so that external air entering the drive is filtered prior to contacting the sensitive components within the drive. The inlet may optionally be covered with a filter media to not only provide particulate filtration of the external air before entering the drive, but also, in embodiments where finely divided adsorbent material is used, to retain the adsorbent within the chamber.

In a further preferred embodiment of the invention, the aforementioned inlet hole is situated at an opening of a diffusion tube either in or on the rigid frame or in the disk drive housing. A second opening of the diffusion tube is configured to line up with a breather hole in the disk drive housing so that external air entering the drive through the breather hole passes through the diffusion tube before reaching the inlet. As noted, the diffusion tube may be present in an exterior or interior surface of the rigid frame, or it can be enclosed within a wall of the rigid frame and have openings to the interior and exterior.

Suitable materials for use in the rigid frame of the present invention are those having a flexural modulus as specified earlier herein, and include polymers (such as polycarbonate, polypropylene, acrylic, epoxy resins, etc.), metals (such as aluminum, stainless steel, brass, etc.), ceramics (such as alumina, glass, etc.), and composites (such as reinforced epoxy resins, etc.). The rigid frame may be formed by any of numerous suitable means, alone or in combination, including injection molding, thermoforming, extrusion, machining, casting, hot isostatic pressing, stereolithography, etc., using one or more materials appropriate to the means of formation as would be evident to one skilled in the art. The frame may be formed as one piece or as two or more separate pieces which are assembled into one final piece. The latter approach may be especially suitable as a means to form a diffusion tube embedded within a wall of the rigid frame, as described above, whereby the diffusion tube could be formed into one or both mating surfaces as a channel or cavity with suitable openings. An alternative approach for forming such an enclosed diffusion tube is insert molding, wherein the rigid frame is molded around a dissimilar material having the shape and occupying the volume of the diffusion tube. After molding, the dissimilar material is removed by e.g., melting, dissolution, etc., leaving a channel or cavity within the frame. In a preferred embodiment, the rigid frame is formed of a material which is clean or cleanable, such as polycarbonate or fluoropolymer. In a particularly preferred embodiment, the rigid frame is formed of polycarbonate by means of injection molding.

The adsorbent filter material, as explained in further detail below, may include a wide variety of materials. The general term "adsorbent", as used herein is not meant to refer to any particular material or material for adsorption of any particular contaminants. The terms "adsorbent" and "adsorb" are not intended to be limiting with respect to the manner or mechanism of vapor entrapment. That is, the terms are intended to refer to any mechanism of entrapment whether it be adsorption, absorption or some other mechanism.

Further, the adsorbent may comprise one or more adsorbent materials, such as finely divided forms of activated carbon (powder, granules, beads, etc.), activated carbon fabric, paper, or fibers, or may be a filled matrix such as a scaffold of porous polymeric material compounded with adsorbents that fill the void spaces. Other possibilities include adsorbent impregnated non-wovens or beads on a scrim where the non-woven or scrim may be cellulose or polymeric and may include latex or other binders, porous castings or tablets of adsorbents and fillers that are polymeric or ceramic, as well as encapsulated adsorbents such as finely divided adsorbent in a pouch of porous membrane or other air-permeable material. The adsorbent may also be a mixture of different types of adsorbents. The adsorbent may further comprise unique geometries which present high surface area for contact with the air in the drive, and thus enhanced adsorption, such as those geometries described and shown in more detail herein.

Examples of adsorbent materials include physisorbers (e.g. silica gel, activated carbon, activated alumina, clay, molecular sieves, etc.), chemisorbers (e.g. potassium permanganate, potassium carbonate, potassium iodide, calcium carbonate, calcium sulfate, sodium carbonate, sodium hydroxide, potassium hydroxide, sodium iodide, calcium hydroxide, powdered metals (e.g., silver and copper) or other reactants for scavenging gas phase contaminants, etc.), as well as mixtures of these materials. For some applications, it may be desirable to employ multiple adsorbent materials, with each adsorbent selectively removing different contaminants as they pass through the filter.

Preferably, the adsorbent may comprise silica gel, activated carbon, whether untreated or chemically treated for adsorption of acid gases or the like (e.g., treatment with potassium carbonate, calcium carbonate or sodium carbonate); molecular sieve, activated alumina, and mixtures thereof. Another preferred embodiment of the adsorbent utilizes an adsorbent filled PTFE sheet wherein the adsorbent particles are entrapped within the reticular PTFE structure as taught by U.S. Pat. No. 4,985,296 issued to Mortimer, Jr. and specifically incorporated herein by reference.

Suitable filter materials for the present invention include such filter media as filter papers or filter membranes such as expanded polytetrafluoroethylene (ePTFE), polypropylene, or polyethylene membranes, non-wovens or scrims (e.g., polyester or polyolefins), or cast polymeric membranes, or some combination of filter materials. Moreover, electret filter media (i.e., fibrous material capable of retaining localized electrostatic charge), may be used to locally attract and capture particles of opposite charge. Filter materials may also be laminated to support layers such as polymeric non-wovens, screens, or scrims. Further, filter materials with varying properties can be incorporated in different locations of the multi-functional filter to optimize performance of the filter. For example, high air flow filter media (generally greater than 100 Frazier ($ft^3/mm/ft^2$ at an air pressure of 0.5 inches of water)) is typically preferred for the recirculation filter section with at least moderate particle filtration efficiency (e.g., 25–90% for 0.1 $\mu$m diameter particles), while higher efficiency (i.e., greater than 90% for 0.1 $\mu$m diameter particles) filter media may be desired for the breather or adsorbent section. If greater convective flow is desired through the adsorbent filled chamber in order to obtain active adsorption within the drive, low efficiency (i.e., below moderate) media over the openings of the chamber may be paired with high efficiency media over the inlet hole to the chamber and preferably with an adsorbent which is resistant to particulates, such as a beaded, solid, or sheet form. If primarily passive adsorption is desired within the drive, higher efficiency filter media may be used over the openings of the adsorbent conducting chamber and lower efficiency, higher flow media may be used in the recirculation filter section and optionally over the inlet hole to the chamber. Also, the filter media in the adsorbent components of the filter may be selected to optimize the adsorbent containment function if other components are optimized for particle filtration and air flow. For example, if a finely divided form of adsorbent is used or if the filter receives a great deal of handling upon assembly, then filter media with high mechanical strength (Ball burst greater than 0.5 lbs) is preferred. In a drive with high motor speed (generally 7200 rpm or greater), a preferred embodiment includes high flow filter media over the upstream opening of the adsorbent-filled chamber, high strength, high efficiency media over the downstream opening of the chamber, and high flow, moderate efficiency filter media in the recirculation filter section. The specific performance requirement of a given filter application will dictate the choice of filter media used; however, it is the novel configuration of the present invention that allows enhanced flexibility in optimizing the filter performance.

Particularly preferred filter media for the present invention are those made with ePTFE membranes. These membranes have a high moisture vapor transmission rate (i.e., typically greater than 5000 g/m$^2$/day, as measured by the modified inverted cup method such as is described in U.S. Pat. No. 4,862,730 issued to Crosby and incorporated herein by reference), which allows contaminants in the air to quickly and easily diffuse through the membranes into the adsorbents. They can also be made with very good filtration efficiencies, which is especially beneficial for the breather filter function. An example of a preferred ePTFE membrane is that made in accordance with U.S. Pat. No. 3,953,566 with an efficiency of at least 99.97% for 0.3 microns diameter particles and a permeability of at least 7 Frazier. Such membranes are commercially available in finished filter form from W. L. Gore and Associates, Inc., Elkton, Md.

Expanded PTFE membrane filter materials can also be used to cover the adsorbent material and act as particulate filtration media. One such preferred filter media to contain the adsorbent is a layer of expanded PTFE membrane made in accordance to U.S. Pat. No. 5,814,405 issued to Branca et al. incorporated herein by reference. This filter media may optionally be structurally supported by a layer of woven, nonwoven, or expanded porous material, such as polyester, polypropylene, polyamide, etc. This filter media has several advantages. For example, it can be made to have a combination of high air flow and high strength such that the product of Frazier Number (ft$^3$ per minute/ft$^2$ at an air pressure of 0.5 inches of water) and Ball Burst (pounds) is at least 100. Preferred support layers include a Reemay 2014 polyester nonwoven, 1.0 oz/yd2 available from Reemay, Inc., Old Hickory, Tenn., or a Delnet 0707 polypropylene scrim available from Applied Extrusion Technology, Inc., Middletown, Del.

Using expanded PTFE membranes as a filter material in the present invention imparts a number of advantages to this improved filter construction. PTFE is hydrophobic. Some adsorbents used in industry use a water-soluble salt to impregnate a physical adsorbent such as activated carbon to provide a chemical adsorbent with a large active surface area. By covering the carbon layer with the expanded PTFE membrane, it makes the final part waterproof so that deionized water can come into contact with the part and not penetrate the adsorbent. Thus, the salt treatment is not susceptible to removal by water washing. Ionic contamination has become a big concern for corrosion susceptible apparatus such as computer disk drives. Ions of concern, such as chlorine and sulfur dioxide, are readily soluble in water, and thus a deionized water wash has become routine for many components used within the drive. Thus, some embodiments utilizing expanded PTFE filter layers to encapsulate the adsorbent can be constructed to allow use of water soluble salt treated adsorbents incorporated into the adsorbent layer and can withstand washing without loss of adsorbent treatment and effectiveness. For example, expanded PTFE membranes having a water entry pressure of about 10 psi or greater would be suitable for such washable applications.

Another preferred filter media is a layer of an electrostatic electret material available in finished filter form from W. L. Gore and Associates, Inc. under the trademark GORE-TRET® recirculation filters. Advantages of this filter media are that it is very high in efficiency (e.g., in excess of 90% @0.3 micron) and also very low in resistance to air flow (e.g., less than 1 mm H$_2$O at 0.5 fpm or 3.2 m/min). While this media loses its charge while being washed with deionized water, it immediately regains its efficiency upon drying due to the electret effect of the mix of dissimilar fibers.

The multi-functional filter of the present invention may be mounted to the disk drive in any suitable manner which provides a good attachment to the drive housing, such as adhesion, welding, mechanical locking, pressure fit, etc. In one preferred embodiment an adhesive material may be used to attach the filter to the disk drive. It should be apparent to one of skill in the art that the adhesive may comprise a pressure sensitive adhesive layer, a double-sided adhesive tape on a backer material or multiple sided adhesive on multiple backers, depending on the desired construction of the filter. The adhesive may also comprise a heat sensitive or UV or other curable adhesive layer. Prior to attachment to the disk drive housing, the exposed adhesive layers may have one or more release liners adhered thereto to protect the adhesive and to facilitate handling of the filters. The release liners would be removed prior to assembly of the filter onto the disk drive enclosure.

In an alternative embodiment, the filter may be configured to permit "drop-in" assembly, wherein the filter is easily located in the drive after the drive is assembled. As described in more detail herein, tabs or other support members may be located on the surface of the filter which is to be mounted to the drive. For example, a corresponding opening in the drive allows insertion of the filter so that the tabs or support members fit into a recessed area in the drive housing. An appropriate seal or adhesive tape may then be located on the exterior or interior of the drive housing to secure the filter. In a further alternative embodiment, the filter could be assembled with the disk drive by a "lock-in-place" mechanism wherein the filter is mechanically attached to the drive lid or base plate without the use of adhesive. Such mechanical attachment may be accomplished by means including screwing a threaded filter into a tapped hole or receptacle, hinged tabs or slots on the filter which may be extended over mating features on the lid or base plate, or a "twist and lock" mechanism such as one utilizing a tab on the drive which gradually slides over a ramp and then drops into a mating notch on the filter as it is twisted into place. These means of mechanical attachment all share the advantage that they allow the drive and the rigid filter frame to support the stresses associated with assembly of the filter and attachment of the lid to the drive, relying on adhesive tape for achieving a seal but not for mechanical support. Mechanical attachment is suitable either for assembling the filter to the lid or base plate prior to attachment of the lid to the base plate, or for drop-in assembly as described earlier.

In a preferred embodiment of the present invention, the filter may incorporate a gasket which may seal the filter to the disk drive enclosure. The gasket is preferably a resilient material, such as rubber or fluoropolymer, affixed to the surface of the filter facing the breather hole in the disk drive, with the inlet hole located within the inner perimeter of the gasket. The use of a gasket can provide numerous advantages for example, in ease of assembly of the filter into the disk drive or other enclosure, eliminating the need for precise alignment of the inlet to the adsorbent-filled chamber or diffusion tube over the breather hole. In addition, ease of repositioning and replacement of the filter can be enhanced with a gasket, reducing or eliminating the potential damage to the filter and other problems associated with repositioning a filter bonded to the base plate using adhesive. Use of a gasket is particularly advantageous in combination with a filter configured for drop-in assembly or mechanical attachment to the drive lid or base plate prior to attachment of the lid to the base plate, as earlier described. In such preferred embodiment, a filter incorporating a suitable gasket may be readily positioned during assembly and the filter or lid may be easily or repeatedly removed or repositioned.

In a further embodiment of the present invention, the gasket may extend beyond the perimeter of the rigid frame and incorporate one or more additional openings in order to seal other components within openings of the drive enclosure, such as the flex cable connector.

By incorporating additional features into the multi-functional filter of the present invention, it may be possible to alter or control the flow of air within the disk drive to optimize the filter performance. Design variables affecting the distribution of air flow between the recirculating filter component and adsorbent component of the filter include: relative sizes, shapes, and orientations (e.g., coplanar, inclined, coaxial, etc.) of the openings of the recirculation filter component and the adsorbent-filled chamber. For example, in a preferred embodiment of the present invention the filter includes a tapered constriction within the adsorbent-filled chamber by which a venturi is created, which, during operation of the filter, creates a reduced pressure accompanied by an increased velocity as fluid (air) flows through the constriction. Other means for optimizing the air flow through the filter include locating the filter within the enclosure in a region of high air flow, reducing bypass flow of air around the filter by minimizing the spacing between the filter and side walls of the enclosure. Achievement of the latter objective is facilitated by the rigid frame of the present invention, allowing tight dimensional control and stability. Additionally, the inclusion of one or more projections or air channeling features, such as a vane, at one or more selected locations on the rigid frame can serve to alter the flow of air through the filter.

BRIEF DESCRIPTION OF THE DRAWINGS

The operation of the present invention should become apparent from the following description when considered in conjunction with the following drawings, in which.

DETAILED DESCRIPTION OF THE INVENTION

Figure 1:
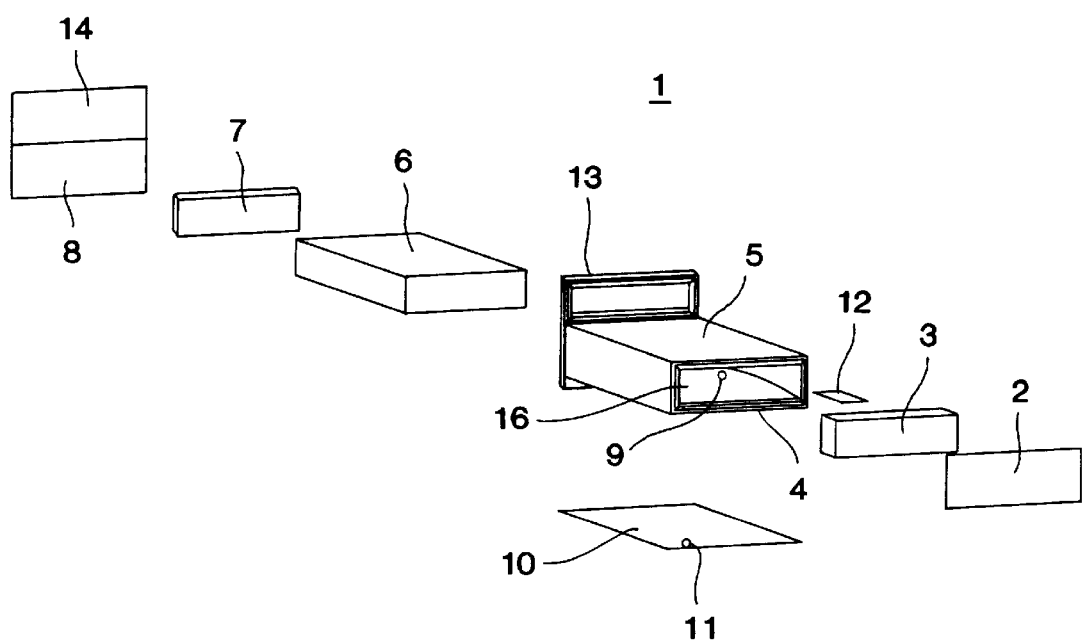
FIG. 1 is an exploded view of one embodiment of a rigid filter of the present invention.

Referring to FIG. 1, there is shown an exploded view of the components of a first embodiment of the rigid multi-functional filter 1 of the present invention. The filter 1 comprises a frame 5 with a first open end 4, a chamber defining a volume 16 and an extension having an opening therein 13 extending adjacent the rigid frame and oriented perpendicular to and above the chamber 16. The frame 5 has a second open end (not shown) at the opposite end of the chamber 16. An inlet 9 is located in a bottom side of the chamber 16 and connects to a diffusion tube (not shown) on the bottom side of the housing 5. Adhesive material 10 adjacent this bottom side covers the diffusion tube and may be used to bond the filter 1 to a mounting surface, such as a lid or base plate of a disk drive. The adhesive material 10 includes a hole 11 over the entrance to the diffusion tube, thereby permitting fluid communication between the diffusion tube and a breather hole located in the mounting surface. The inlet 9 in the chamber 16 is covered by a microporous particulate filtration media 12 which is affixed to the inner surface of the chamber 16.

The filter 1 further comprises a first layer of microporous particulate filtration media 2 which is adjacent to a first layer of fibrous electret particulate filtration media 3, both of which cover and are affixed to the first open end 4 of the rigid frame 5. The second open end (not shown) of the chamber 16 similarly has a second layer of fibrous electret particulate filtration media 7 and a second layer of microporous particulate filtration media 8 affixed thereto. An adsorbent media 6 is located within the chamber 16. A microporous filtration media 14 is affixed to the opening in the extension 13.

Figure 2A:
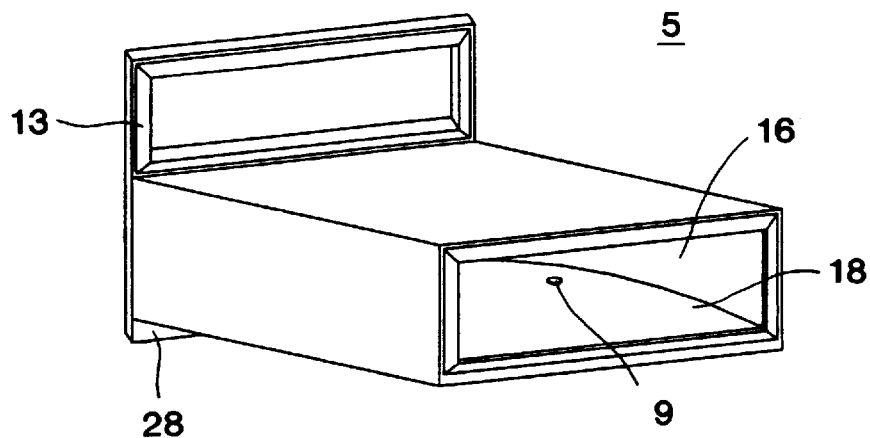
FIGS. 2a, 2b and 2c show alternative top, side and bottom perspective views of the rigid filter of FIG. 1.
Figure 2B:
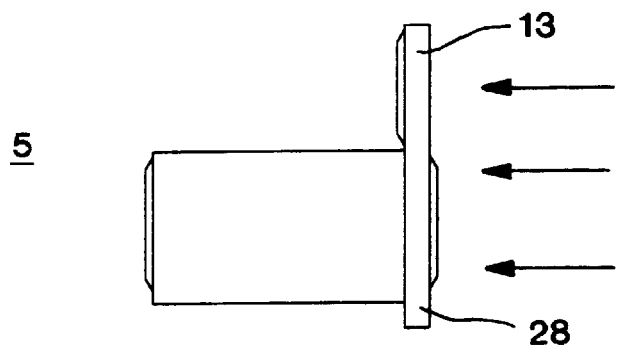
Figure 2C:
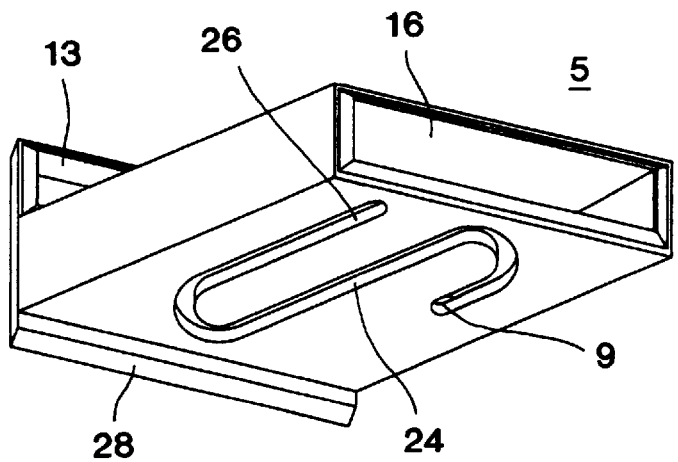

The rigid frame 5 of FIG. 1 is further depicted in top, side and bottom perspective views in FIGS. 2a, 2b and 2c, respectively. As shown in FIG. 2a, in a preferred embodiment the adsorbent chamber 16 is bounded by one or more interior sides, or walls, having the shape of a venturi 18. The inlet 9 in the adsorbent chamber is preferentially within the constriction of the venturi 18, and more preferentially at the region of smallest cross-sectional area along the chamber 16, so that the reduced pressure due to the venturi assists in drawing air through the inlet 9 and into the filter 1.

FIG. 2b shows a side view of the rigid frame 5, the arrows indicating the direction of recirculating air flow for the configuration described in the Example.

FIG. 2c is a bottom perspective view of the rigid frame 5 showing the diffusion tube 24 embedded in the outside of the bottom side of the chamber 16. The entrance 26 to the diffusion tube is configured to be aligned with a breather hole in the mounting surface, while the inlet 9 to the adsorbent chamber from the diffusion tube is located at the opposite end of the diffusion tube. Also visible is a tab 28 on the frame 5 for locating and aligning the device on a mounting surface designed to mate with the device. This optional tab may take any desired configuration, such as extending across only a portion of the housing, multiple projections from the housing, etc.

Figure 3:
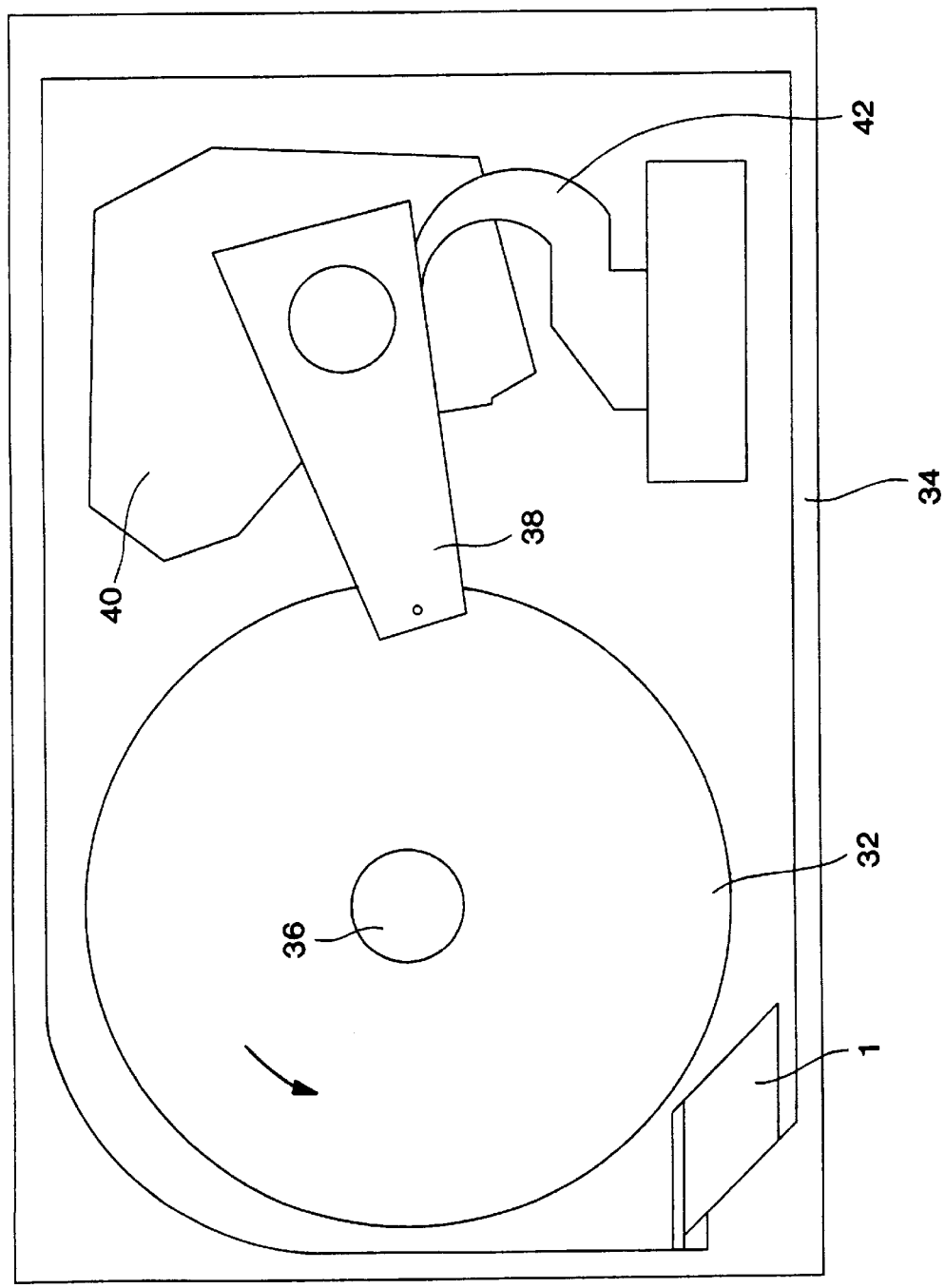
FIG. 3 is a schematic illustration of the rigid filter installed in a disk drive, as described in Example 1.

FIG. 3 is a schematic illustration of a disk drive assembled with the multi-functional filter 1 of FIG. 1 as assembled and tested in the Example. The filter 1 is situated in close proximity to the disk media 32 in a location where the walls of base plate 34 conform closely to the edges of the disks 32 and the filter 1, in order to maintain a large flow of air towards the filter 1 when the drive is operating. The disks 32 are mounted on the motor hub 36, whose direction of rotation is indicated by the arrow. The E-block 38 is shown reintegrated, after removal of the heads, with the voice coil motor 40, which is in turn connected to the flex circuit 42.

Figure 4:
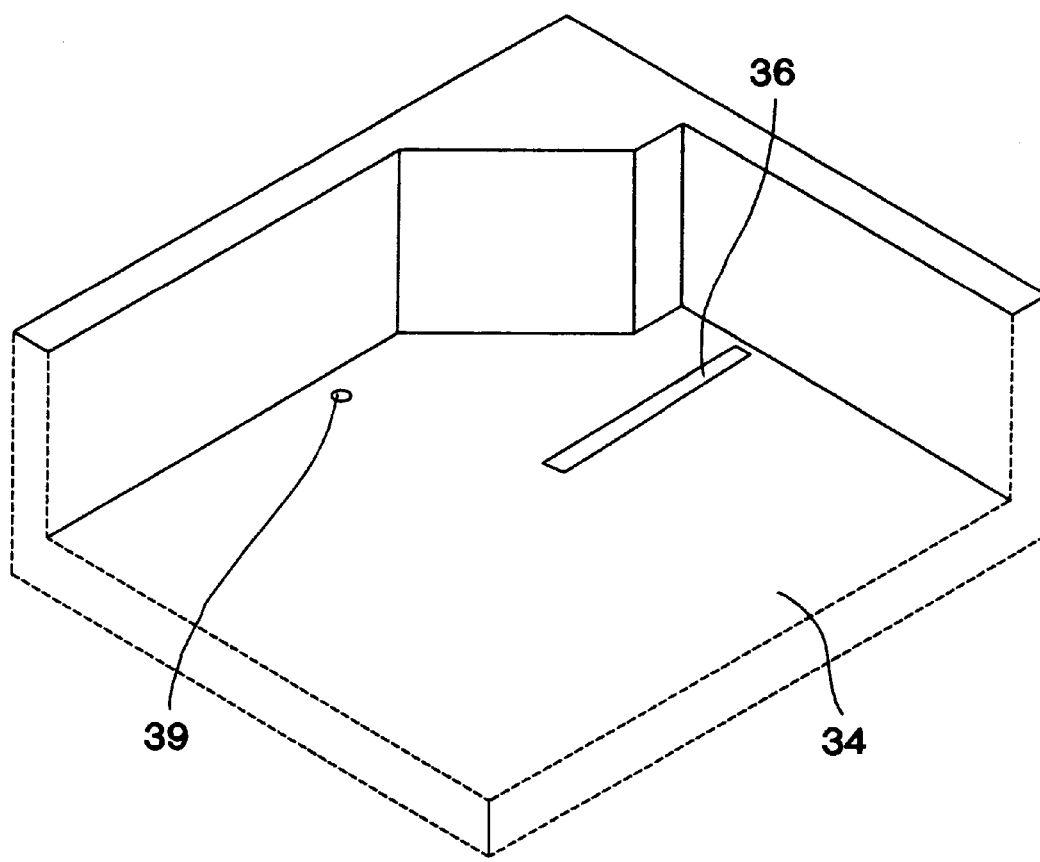
FIG. 4 is a schematic view of the portion of the disk drive housing of FIG. 3 as configured for installation of the rigid filter.

FIG. 4 is a schematic cut-away view of the corner of the disk drive as modified for incorporation of the device 1 of FIG. 1. The drive base plate 34 is shown with a slot 36 for mating with the tab 28 on the rigid frame 5 for accurately locating and aligning the device. Using the tab 28 and slot 36 to correctly position the device 1, the hole 11 in the adhesive surrounding the entrance 26 to the diffusion tube 24 is aligned with the breather hole 39 in the base plate 34. Depending on the configuration of the multi-functional filter of the present invention, it would be recognizable to an artisan of skill in the art that appropriate modifications to the configuration of the disk drive can be made to accommodate placement of the rigid multi-functional filter.

Figure 5:
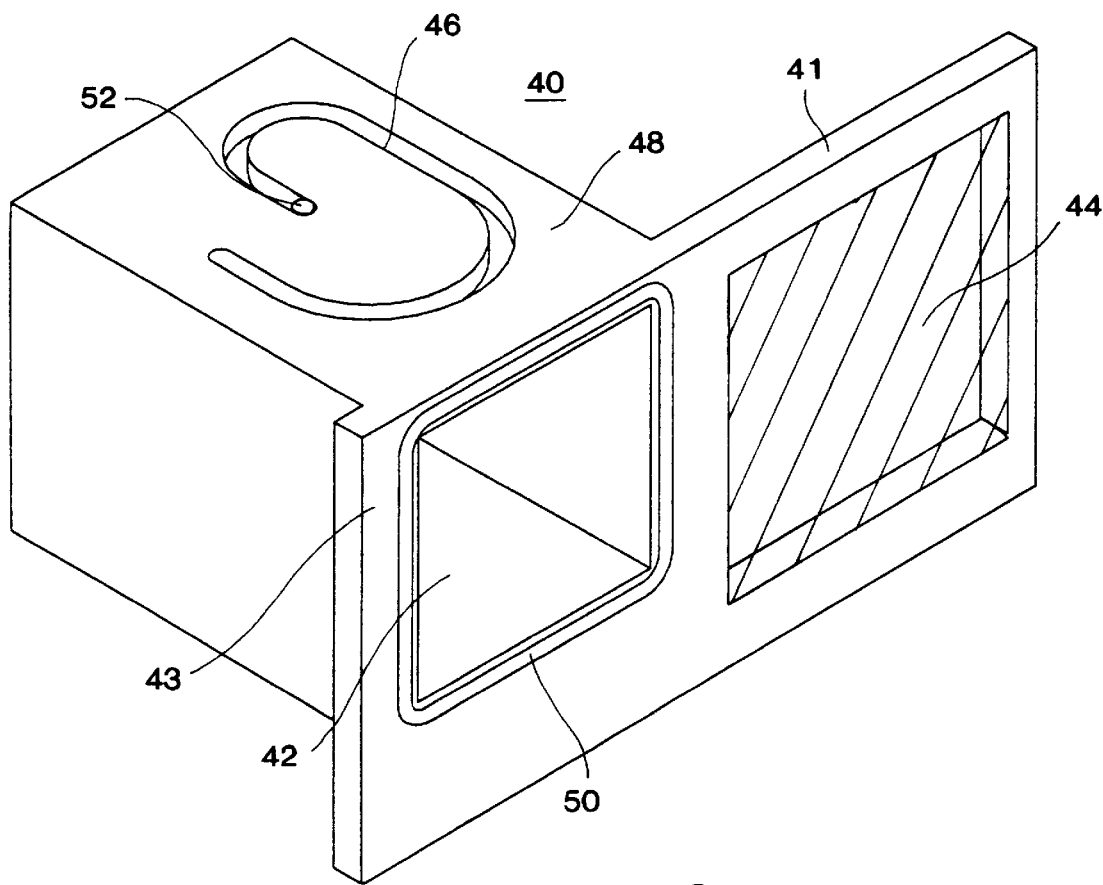
FIG. 5 is a side perspective view of another embodiment of a rigid filter element of the present invention.

FIG. 5 is a schematic view of some features of another embodiment of the rigid multi-functional filter of the present invention. One way in which the filter 40 differs from the filter depicted in FIG. 1 is in the lateral orientation of the extension 41 extending from the rigid frame 43 relative to the location of the diffusion tube 46 and the chamber 42. Extension 41 has filter media 44 affixed thereto. This filter component filters particulates from recirculating air within the disk drive during operation. Diffusion tube 46 is located in the side, or wall, 48 which is the surface which contacts the enclosure upon mounting the device in the disk drive. The chamber 42 holds a quantity of adsorbent (not shown in the figure) and has a first open end 50 and a second open end, (not shown) which are covered by particulate filtration media (also not shown) similarly to that described with respect to FIG. 1. The inlet 52 from the diffusion tube 46 may be optionally covered internally by a layer of microporous particulate filtration media or by a layer of highly permeable material such as a scrim or non-woven.

Figure 6:
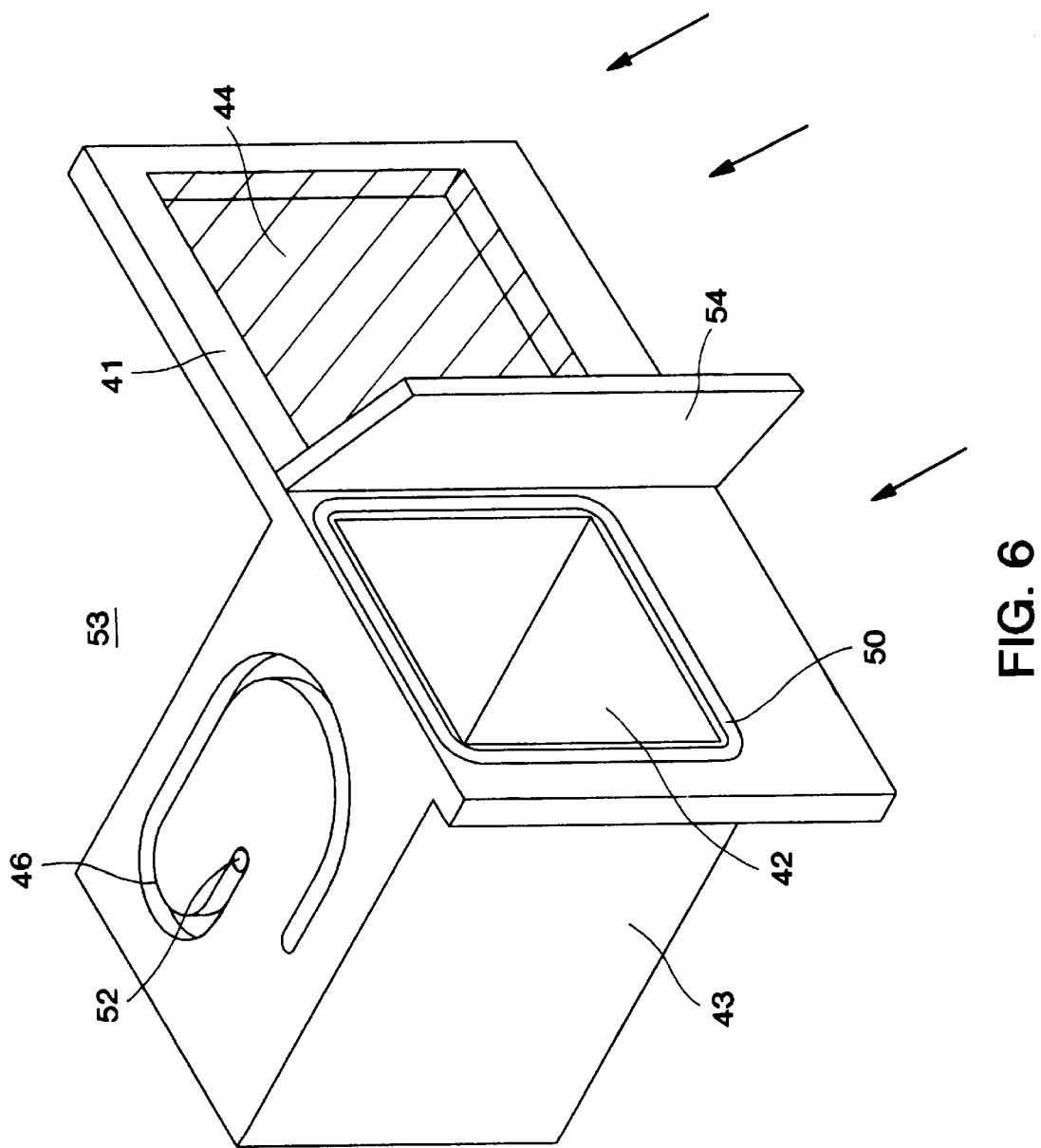
FIG. 6 is a side perspective view of a further embodiment of a rigid filter element of the present invention.

A modification of the device 40 depicted in FIG. 5 yields the features of the device 53 illustrated in FIG. 6. Particularly, in this embodiment, the rigid frame 43 further includes an air flow deflection vane 54. The vane 54 is located on the upstream (i.e., facing the incoming air) side of the device 53, the direction of air flow being indicated by the arrows. Inclusion of such an air deflection vane 54 can serve to alter the distribution of air flow between the recirculating filter media 44 and the adsorbent (not shown) in the chamber 42.

Figure 7A:
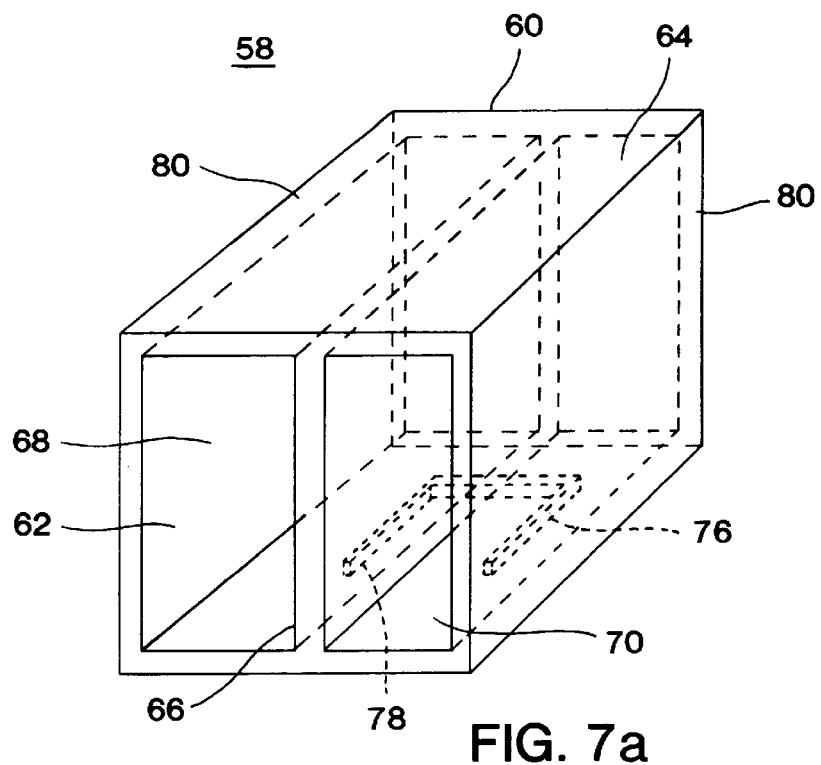
FIGS. 7a and 7b are side perspective views, with internal features depicted by dotted lines, of further alternative embodiments of a rigid filter element of the present invention.
Figure 7B:
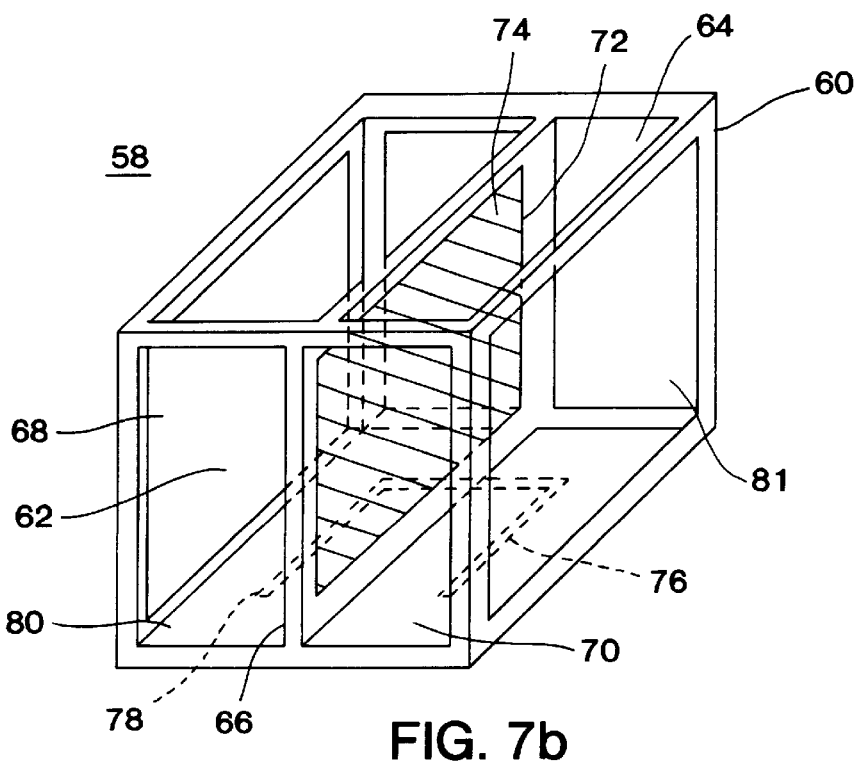

FIGS. 7a and 7b show features of further alternative embodiments of the present invention, wherein the internal features not visible from the exterior of the filter are depicted with dotted lines. Referring to FIG. 7a, the multi-functional rigid filter 58 includes rigid frame 60 with walls, or sides, 80, first open end 62 and second open end 64 which, in use, are covered with particulate filtration media (not shown in the figure). In use, the filter 58 is preferably positioned within a disk drive (not shown in the figure) such that the open ends 62 and 64 are situated in the path of the recirculating air stream. Within the rigid frame 60 is a wall, or partition, 66 which creates a chamber 68 and an adjacent extending chamber 70. Chamber 68 is filled with adsorbent (not shown) for adsorbing undesired components from the disk drive. The wall 66 can be impermeable to air flow, as shown in FIG. 7a, or alternatively, may have an opening 72, as depicted in FIG. 7b, covered with a permeable media 74 such as a non-woven layer, scrim, polymer screen, or particulate filtration media.

Referring again to FIG. 7a, a diffusion tube 76 can be incorporated into a side, or wall, 80 of rigid frame 60 with an inlet 78 from the diffusion tube 76 into the chamber 68. Depending on the desired construction, as mentioned with respect to an earlier configuration of the rigid filter, the inlet may optionally be covered by permeable media to keep adsorbent media out of the inlet hole and/or for filtering particulates from the inlet vapor stream. The chamber 70 can be empty between the layers of filtration media (not shown) covering the first open end 62 and second open end 64, as shown in the Figures.

In an alternative configuration to that shown in FIG. 7b, a particulate filtration media, such as a high air flow (i.e., 100 Frazier (ft$^3$ per minute per ft$^2$ at an air pressure of 0.5 inches of water)) electrostatically charged electret felt may be located in the chamber 70. The opening 72 covered with permeable media 74 allows communication between the air flowing through the chamber 70 and the adsorbent in the adsorbent chamber 68.

FIG. 7b also shows openings 81 in the rigid frame 60 which can be covered with filter material (not shown). Such a construction lowers the total resistance of the air through the device 58 and/or exposes more of the recirculating air flow to the adsorbent media in the adsorbent chamber 68. One suitable filter media may include an electrostatically charged electret felt including optional non-woven or scrim backer and cover layers on one or more openings of the filter.

Figure 8A:
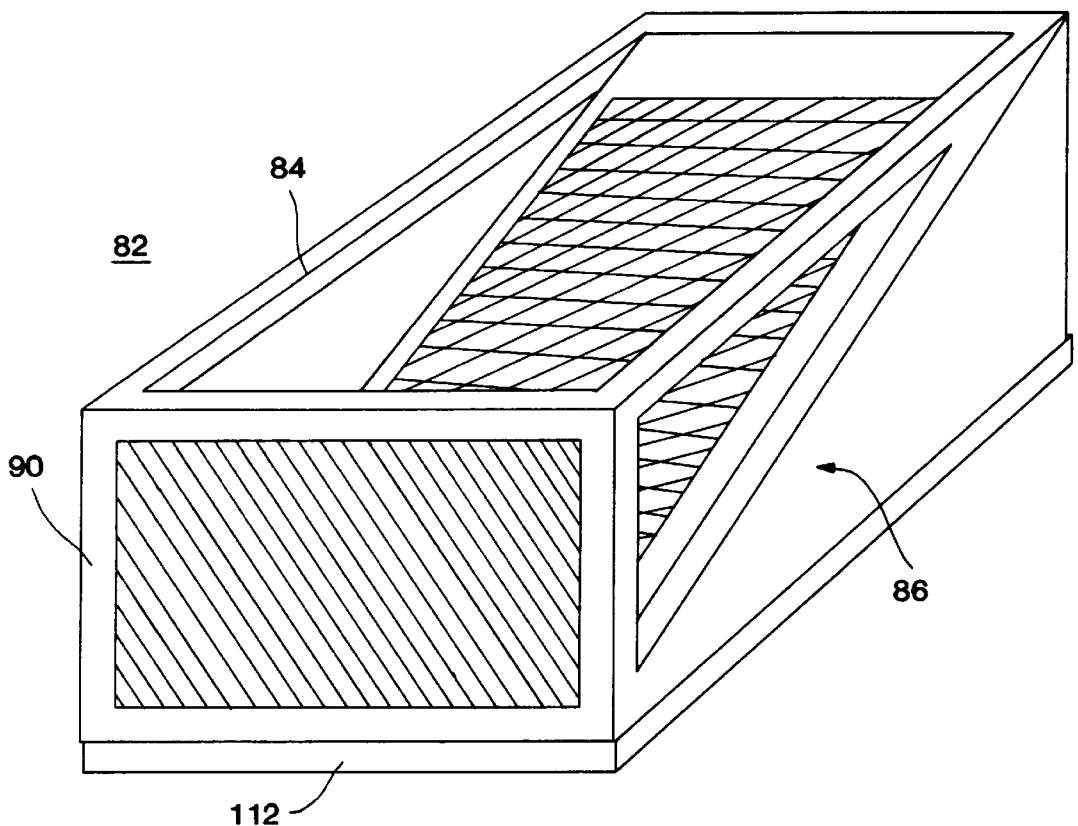
FIGS. 8a, 8b and 8c are side perspective, cross-sectional and bottom perspective views, respectively, of another embodiment of a rigid filter element of the present invention.
Figure 8B:
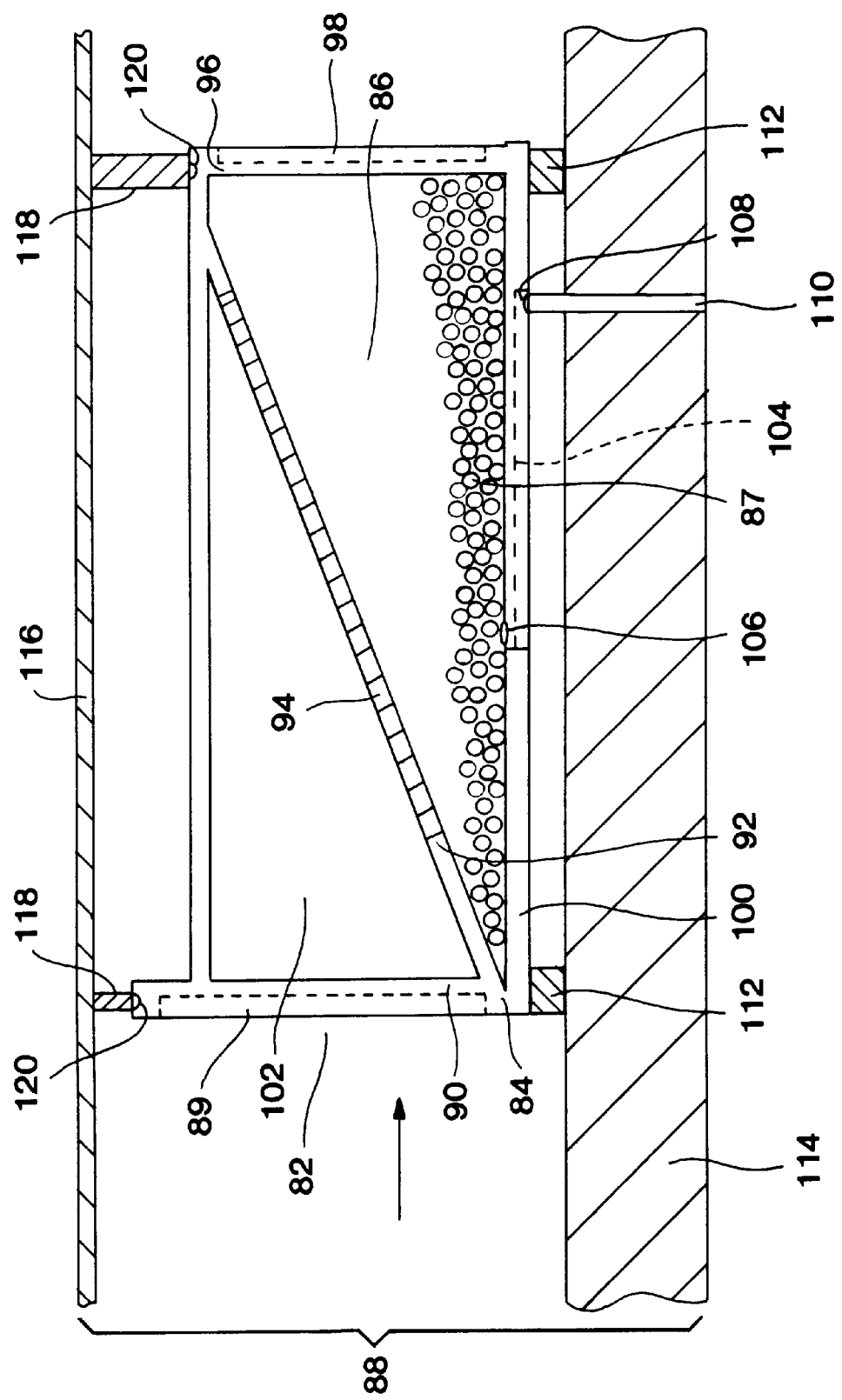
Figure 8C:
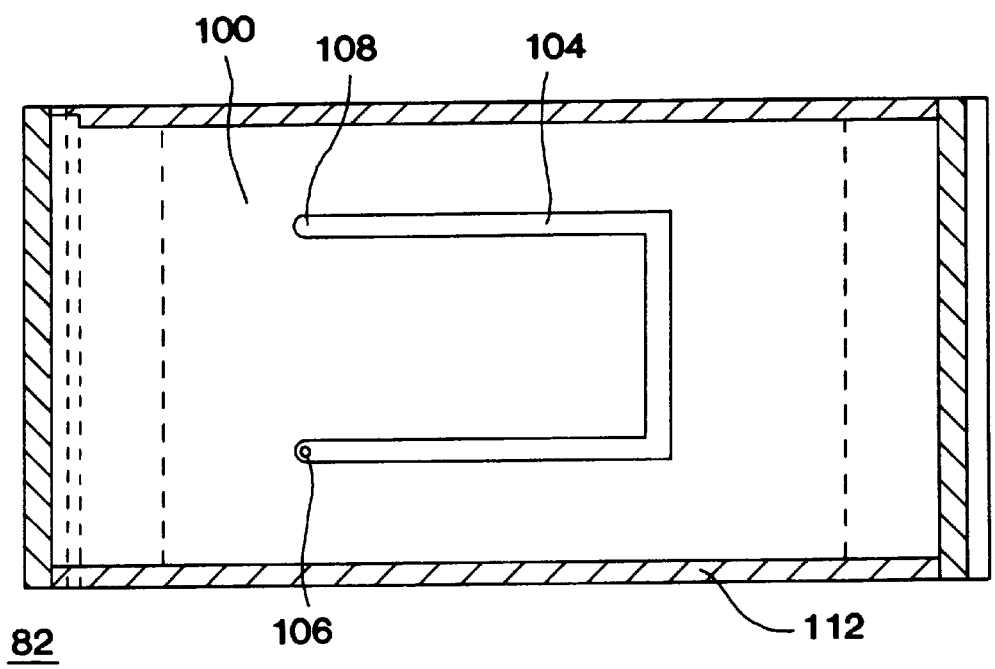

FIGS. 8a, 8b and 8c are side perspective, cross-sectional and bottom perspective views, respectively, of another embodiment of the present invention. As shown in FIG. 8a, the rigid multi-functional filter 82 comprises a rigid frame 84 that contains a chamber 86 for adsorbent media 87 (shown in cross-section in FIG. 8b). The adsorbent media may take the form of loose particulate or bead form (as shown), or may be a three-dimensional structure. Moreover, the adsorbent media 87 may fill the chamber 86 completely or may only occupy a portion of the chamber, as shown in FIG. 8b. When the filter 82 is mounted in a disk drive or other enclosure 88 (FIG. 8b) in which air is recirculating, the direction of recirculating air flow through filter 82 is indicated by the arrow. Filter media 89 covering a frame opening 90 filters the recirculating air of particulates during operation of the disk drive. Some of the recirculating air enters the adsorbent-containing chamber 86 via a frame opening 92 covered with particulate filtration media 94 on the upstream side of the chamber 86, and by exposure to the adsorbent 87 is purified of vapor phase contaminants. The filtered air exits the chamber 86 via a downstream frame opening 96 covered with downstream particulate filtration media 98. As the upstream frame section 92 is oriented at an angle relative to the first open end, or bisects, the rigid frame 84, its dimensions may be preferably engineered to provide a larger surface area than any of the vertical or horizontal sides of the chamber 86, in order to maximize the area of the upstream particulate filtration media 94.

The open or "bypass" regions 102 of the device 82 are open to provide a low resistance bypass for a portion of the air stream to flow around the adsorbent chamber 86. With this feature, the resistance to passage of air through the recirculation filter media 89 is lowered while maintaining a substantial volume of adsorbent media 87 in the chamber 86.

The rigid multi-functional filter may contain an optional diffusion tube, such as shown in FIGS. 8b and 8c. Referring to FIG. 8c, the base 100 of the rigid frame 84 includes a diffusion tube 104. The diffusion tube can be molded into either the interior surface of the base or into the exterior surface, as shown in the Figure, in which case it may be sealed using a sheet of single-sided or double-sided adhesive (not shown) applied to the face containing the molded diffusion tube. When the diffusion tube 104 is in the exterior surface of the bottom 100, a hole in the adhesive is aligned over the entrance 108 to the diffusion tube 104 from the breather hole 110 in the disk drive 88 (FIG. 8b). Inlet 106 allows air to pass into the adsorbent-containing chamber 86. In embodiments where the diffusion tube is in the interior surface of the base, then the adhesive is provided with a hole aligned over the inlet from the diffusion tube to the adsorbent chamber. The diffusion tube can alternatively be enclosed within the filter by forming the rigid structure using a method such as insert molding, for example. In this case, no adhesive is needed to close off a side of the tube, and only the inlet is open to the adsorbent chamber and only the entrance to the diffusion tube is exposed on the exterior surface of the rigid filter.

The novel rigid multi-functional filters of the present invention may further contain an optional gasket which may, among other functions, seal the filter to the disk drive enclosure, thus preventing unfiltered air which enters the breather hole 110 from leaking into the disk drive enclosure 88. As depicted in FIGS. 8a, 8b and 8c, the filter 82 includes gasket 112 attached to the perimeter of the base 100, forming a seal against the base plate 114 of the enclosure 88 (FIG. 8b). Alternatively, a double-sided adhesive can be used to bond the device 82 to the base plate 114. The gasket 112 is a resilient material affixed to the base 100 using adhesive or other suitable means, not shown in the figure. The breather hole 110 is located anywhere within the inner perimeter of the gasket 112, facilitating assembly of the filter into the disk drive.

FIG. 8b also shows a lid 116 of the enclosure 88 which is fastened to the base plate 114 by screws, adhesive, or any other means (not shown in the figure). The lid 116 is depicted with tabs 118 which mate with depressions 120 in the rigid structure 84 of the filter 82 in order to aid in positioning the filter within the enclosure 88. As well, the construction with depressions 120 for insertion of tabs 118 permits exertion of pressure on the filter 82 for the purpose of improving the seal between the base plate 114 and the gasket 112.

Figure 9:
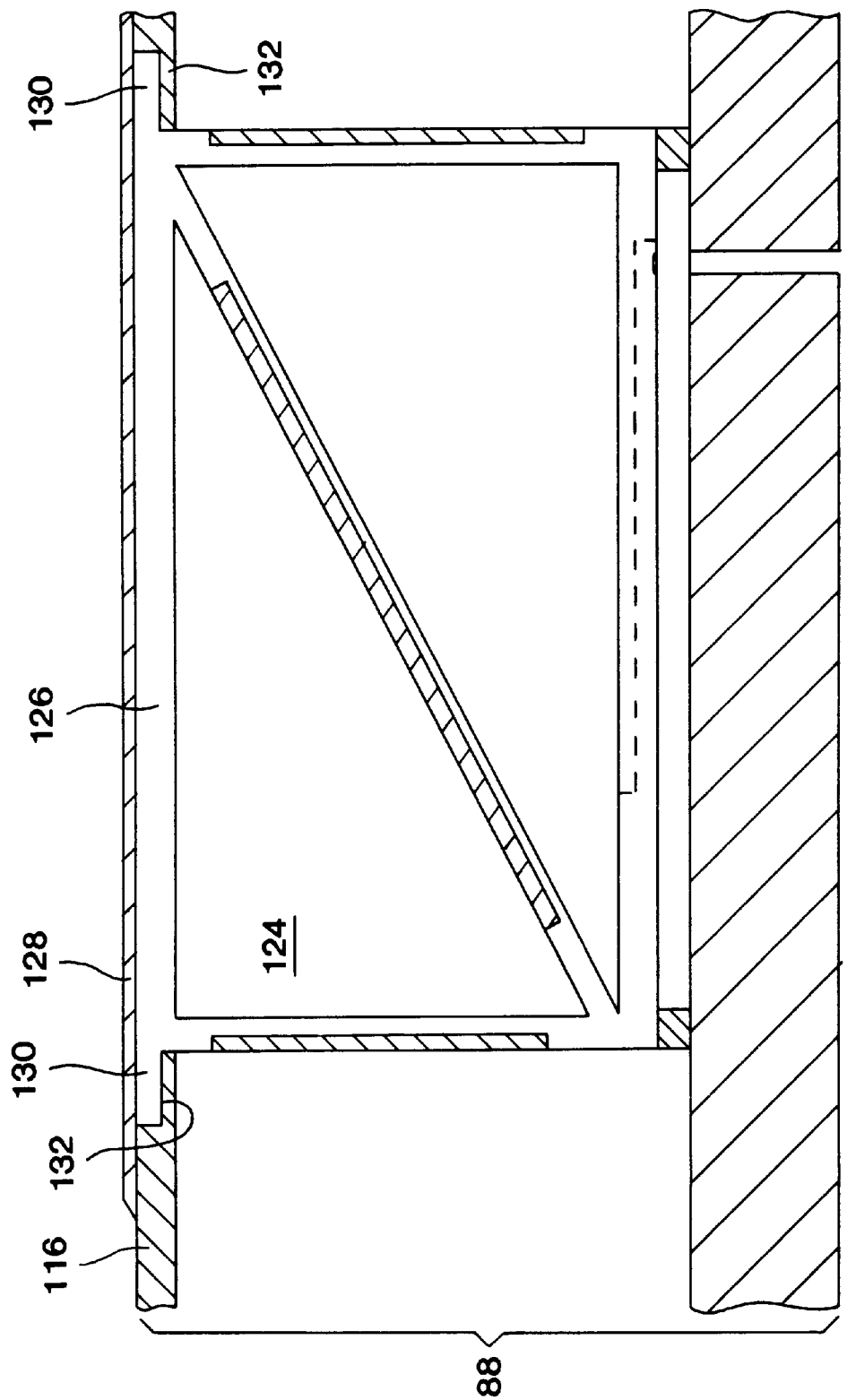
FIG. 9 is a side cross-sectional view of an alternative embodiment of a rigid filter of the present invention assembled into a disk drive housing.

FIG. 9 shows an alternative construction similar to the filter of FIGS. 8a–8c, except that the attachment mechanism for attaching the multi-functional filter within the disk drive enclosure provides a "drop-in" part feature, wherein the device can be readily inserted into an enclosure. Filter element 124 includes a frame member 126 having support extensions 130 which fit into recesses 132 in the disk drive lid 116. This attachment mechanism allows the option during assembly that the filter 124 may be mounted into the enclosure 88 after the lid 116 has been fastened to the base plate 114. An adhesive label or tape seal 128 adheres the filter 124 to the disk drive 88. Support extensions 130 mate with recesses 132 in the lid 116, providing a uniform upper surface over which the seal 128 may be applied.

Figure 10A:
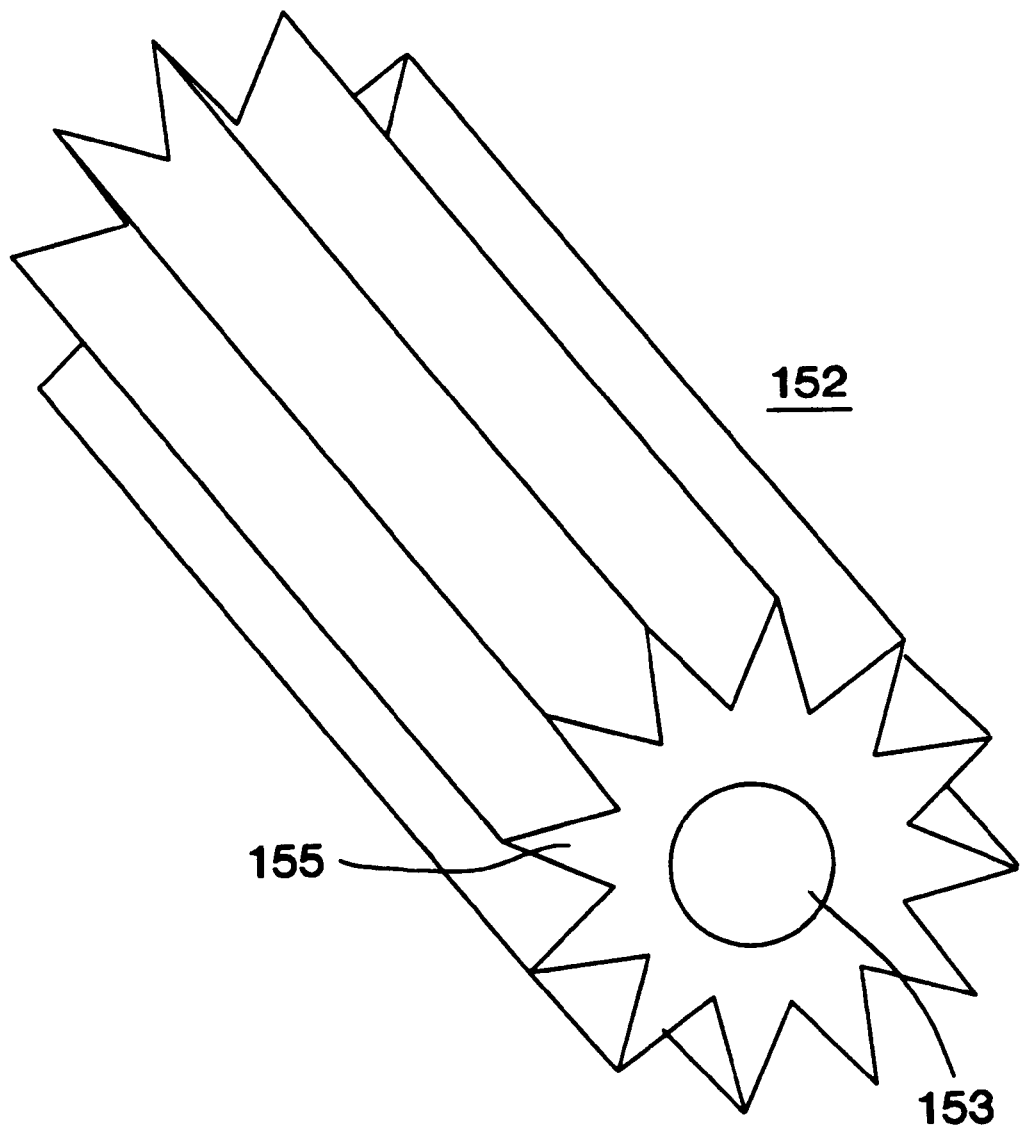
FIGS. 10a and 10b show alternative configurations of suitable adsorbent media which may be incorporated into the rigid filters of the present invention.
Figure 10B:
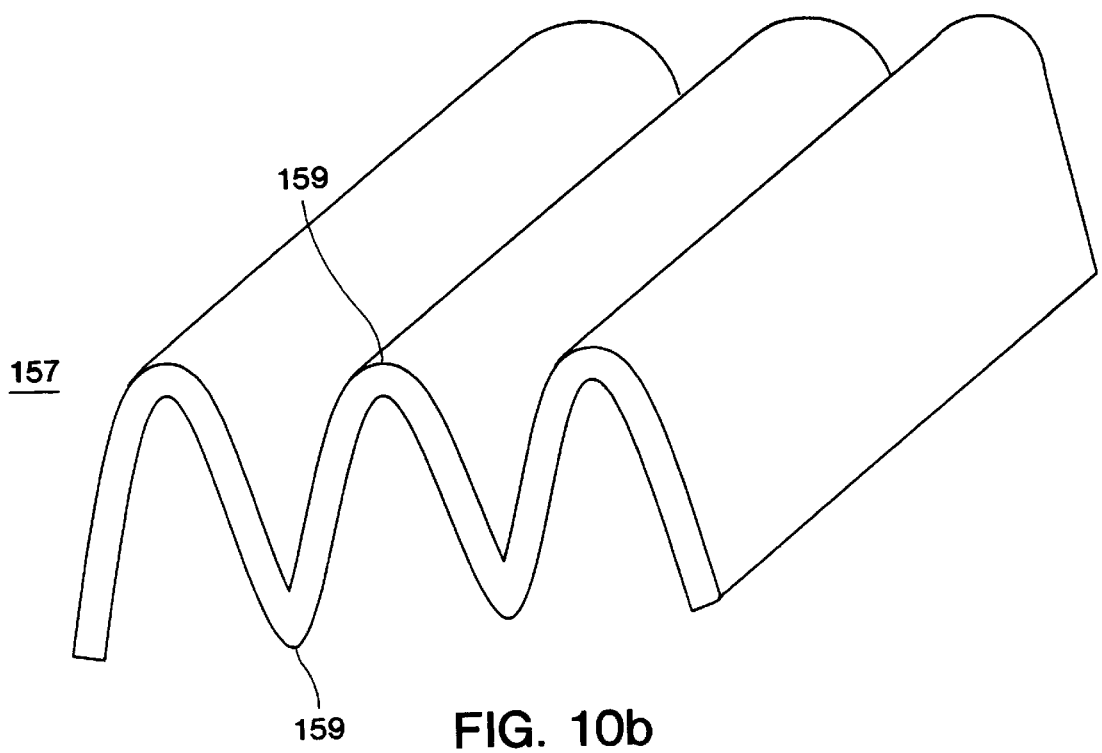

As mentioned earlier herein, in addition to particulate, granular, beaded, or other finely divided forms of adsorbent, other forms such as solids or sheets may be used singly or in combination with divided forms in the present invention. For example, in the embodiment shown in FIG. 1, a sheet-like form of adsorbent, such as activated carbon paper or fabric or an adsorbent-filled composite, may be readily inserted, either alone or with finely divided adsorbent, in the adsorbent containing chamber. Another advantage of a solid or sheet form of adsorbent is the ability to achieve shapes and orientations which favor the passage of air through the adsorbent chamber. FIG. 10a shows one such suitable solid adsorbent 152, which may be obtained using processes including molding, forming, extrusion or the like. The adsorbent 152 is shown having an open central passageway 153 of roughly cylindrical shape, and multiple corrugations or fins 155 projecting radially from the central passageway 153 and running longitudinally along the length of the adsorbent 152. When the adsorbent 152 is oriented within the rigid multi-functional filter so that the recirculating air flows longitudinally along the adsorbent, a low resistance path is provided for air to flow through and around the adsorbent 152 while still exposing a large surface area of adsorbent to the flow. Another form of adsorbent providing low resistance to air flow is shown in FIG. 10b, where an adsorbent sheet 157 includes folds 159 which run longitudinally along the length of the sheet. When the adsorbent 157 is oriented within the rigid multi-functional filter so that the recirculating air flows longitudinally along the adsorbent, a low resistance path is provided for air to flow along the adsorbent 157 while still exposing a large surface area of adsorbent to the flow. An alternative variant of adsorbent material, not shown, is a sheet of adsorbent rolled into a cylinder oriented with its longitudinal axis along the direction of air flow. Separation between neighboring layers of the rolled cylinder could be promoted by fine surface features on the sheet, such as bumps or corrugations.

Test Procedures

Assembly of the Rigid Multi-functional Filter into a Modified Drive

The multi-functional rigid filter of the Example, having the configuration illustrated in FIGS. 1 and 2a–2c, was tested for adsorption and particulate filtration performance using a modified version of a commercially available 3.5 inch form factor disk drive, shown schematically in FIGS. 3 and 4. (Model 90845D4, Maxtor Corporation, Milpitas, Calif.). All drive components except the motor were removed prior to modification of the drive for incorporation of the multi-functional filter. Modification consisted of milling out the existing support structures in the drive for the recirculation filter, drilling a breather hole of $\frac{1}{16}$ inch diameter in the base plate, and drilling two additional holes in the drive lid to allow introduction of contaminants and sampling of the internal drive atmosphere during performance testing. Each of the holes in the lid was covered with a stainless steel fitting (Part No. SS-200-7-4, Baltimore Valve and Fitting Co., Baltimore, Md.,), which was centered over the hole and attached and sealed using two component epoxy. A slot was also machined into the base plate of the drive to facilitate alignment and positioning of the device with respect to the breather hole and the disks. Dimensions of the slot were 14.5 mm width by 1.2 mm height by 1.2 mm depth, designed to accommodate the tab extending across the bottom of the multi-functional filter as shown in FIG. 2c.

Because the filter produced in the Example was designed to work in a drive in which the disks spin in a counterclockwise direction as viewed from above, the motor direction was reversed. This was accomplished by exchanging the position of two of the four electrical leads on the underside of the base plate connecting the printed circuit board to the motor. In addition, the electrical connections to the voice coil motor (VCM), which were located on the flex circuit, were severed in order to keep the E-block in a fixed position during all tests. The drive was cleaned using isopropanol and clean, pressurized air to remove any oils and particulates created during modification. The head suspension assemblies were removed from the E-block prior to re-assembly into the drive in order to eliminate the possibility of head crashes during testing.

Following modification of the drive, the rigid multi-functional filter of the Example was mounted into the base plate. A protective liner which covered the adhesive on the bottom surface of the filter was removed. Using the machined slot in the base plate as an aid to achieve proper alignment, the filter was pressed firmly onto the base plate with the hole in the bottom adhesive located over the newly drilled breather hole in the drive. The disks were then clamped back onto the motor hub using the original spacer rings and clamping ring, and the actuator assembly was reassembled into the drive, including associated E-block, VCM and flex circuit components.

Disk Drive Breather Filter Test

This test is designed to measure the effectiveness of a breather filter in reducing the particle concentration inside a disk drive when the drive is placed in an environment heavily laden with fine particles and air is forcibly drawn into the drive. The performance of the breather filter is quantified by an efficiency, which is the percentage reduction in particle concentration between the external and internal environments of the drive.

The filter of the Example was tested in the modified disk drive, and the pre-existing breather hole in the drive was covered with metallized tape. The lid was fastened securely to the base plate and tape was applied over the screw holes in the lid as well as along the periphery of the drive to seal off any extraneous leaks. A control drive, of the same model and also having had its head suspension assemblies removed, contained an electret recirculation filter but no breather filter. The pre-existing breather hole in the base plate was left uncovered in the control drive to simulate an imperfectly sealed drive.

Figure 11A:
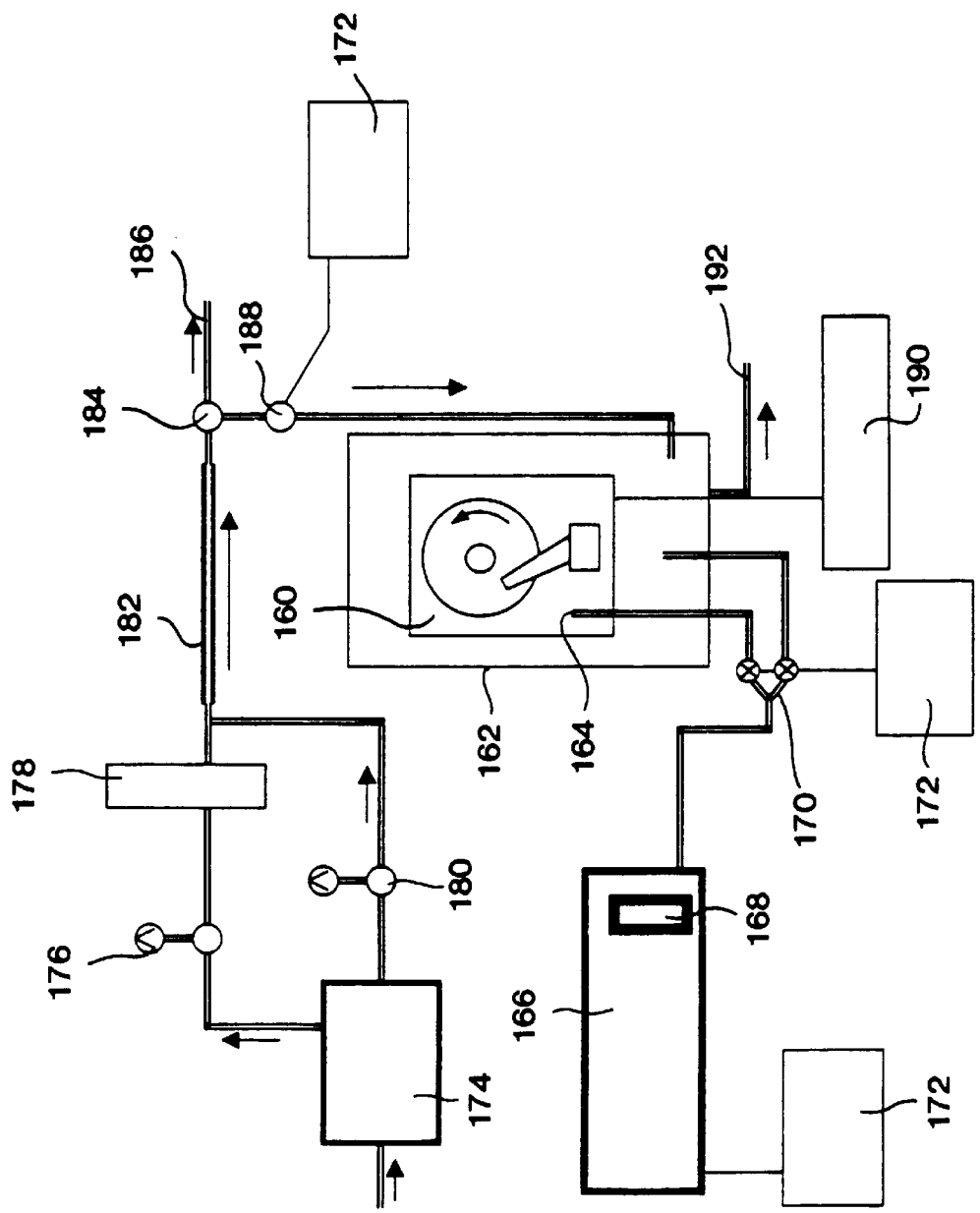
FIGS. 11a, 11b, 12 and 13 are schematic representations of various test rigs used for testing the performance of the rigid filter of the Example.

As schematically illustrated in FIG. 11a, the disk drive 160 was placed inside a stainless steel box 162. One of the two ports in the lid (that which was upstream of the filter based on the direction of disk rotation) was capped to prevent air flow through the fitting. The downstream port 164 was connected using a ⅛ inch outside diameter flexible tube to a port in the wall of the metal box 162, which was connected on the outside of the box via tubing to a laser particle counter (LPC) 166 (Model LAS-X, Particle Measuring Systems, Inc., Boulder, Colo.). Sample flow rate out of the drive 160 and through the LPC 166 was maintained using a flow meter and valve 168 at 1 cc/sec and sheath flow through the LPC 166 was maintained at 40 cc/sec. A second port in the wall of the metal box 162 was connected to a 6 inch length of ¼ inch inner diameter flexible tubing opening onto the interior of the box. The line for sampling the atmosphere in the box was also connected to the LPC 166. The two lines running from the box to the LPC were each connected to a length of flexible tubing passing through a valve 170 which was electronically controlled by computer 172 to simultaneously close off one line while opening the second. Upon exiting the selector valve 170 the two lines met in a 'Y' junction, allowing the LPC 166 to sample one line at a time. A third port in the wall of the metal box 162 was used for the introduction of an aerosol into the internal environment of the box. The aerosol stream passed through a fitting in the port and then was divided into two streams, each of which flowed through a separate tube and entered the box through three gas dispersion tubes (Part Number P-06614-25, Cole-Parmer Instrument Company, Vernon Hills, Ill.). The aerosol consisted of an aqueous suspension of 0.1 $\mu$m and 0.3 $\mu$m diameter polystyrene latex (PSL) spheres (Catalog Number 5010A and 5030A, Duke Scientific Corporation, Palo Alto, Calif.) which provided an approximately 5:1 ratio of 0.1 $\mu$m to 0.3 $\mu$m particles as sampled from the metal box 162. The aerosol was generated by passing filtered compressed air 174 at a regulated (regulator 176) pressure of 39 psi ($2.7 \times 10^5$ Pa) through an atomizer 178 containing the suspension, and further mixing this with a stream of air regulated 180 to 2 psi ($1.38 \times 10^4$ Pa). The aerosol was subsequently passed through a drying tube 182 to evaporate water from the droplets, creating a stream composed primarily of discrete particles. Flow of the dried aerosol stream was controlled by a manual valve 184, allowing a portion of the stream to vent to atmosphere 186 and then through an electrical on/off valve 188 controlled by computer 172. Electrical power 190 to the drive was provided by an electrical connection through a fourth port through the wall of the metal box 162 which was not sealed tightly in order to provide a means for venting to atmosphere 192 any overpressure from the box 162.

After the drive 160 was placed in the box 162 and the connections made for power and air sampling, a gasketed lid was clamped securely to the top of the box 162. Breather tests were performed with both the drive motor off and on. In the case of tests where the motor was on, proper motor function was tested prior to sealing the box 162, and then verified during testing by measuring the current through the electrical power wires using a current probe.

The breather filter test was performed as follows: The aerosol flow was turned on at the beginning of the test and remained on throughout the duration of the test. Initially the box was charged with particles for 120 seconds. Then the box was sampled for 180 seconds in order to allow the particle counts to stabilize, and during which time no data was recorded. Subsequently, the number of 0.1 $\mu$m and 0.3 $\mu$m particles from the box were counted and recorded every 5 seconds for 100 seconds. Next, the drive was allowed to settle for 180 seconds and then sampled every 5 seconds for 100 seconds. The box and drive were monitored for two additional cycles in this same manner, each time allowing 180 seconds for stabilization of the counts and 100 seconds of sampling for both box and drive. Typical levels of the aerosol particles as sampled from the metal box were between 11500 and 18000 per 5 second interval for 0.1 $\mu$m particles and between 2200 and 3700 per 5 second interval for 0.3 $\mu$m particles.

The data recordings were analyzed by obtaining the average particle counts for the box and the drive for each of the three cycles. The efficiency for each cycle was calculated using the following formula:

$$\% \text{ Efficiency} = \{[\text{Average(Box)} - \text{Average(Drive)}] / \text{Average(Box)}\} * 100\%$$

The three efficiency values were then averaged together to obtain the overall breather filter efficiency. This analysis was performed separately for 0.1 μm and 0.3 μm particles.

Disk Drive Recirculation Filter Test

This test is designed to measure the effectiveness of a recirculation filter in reducing the particle concentration inside a disk drive from an initial state in which the drive has been charged with particles. The performance of the recirculation filter is quantified in terms of a cleanup time, which is the time required to reduce the particle counts to a fixed percentage of their initial value.

Figure 11B:
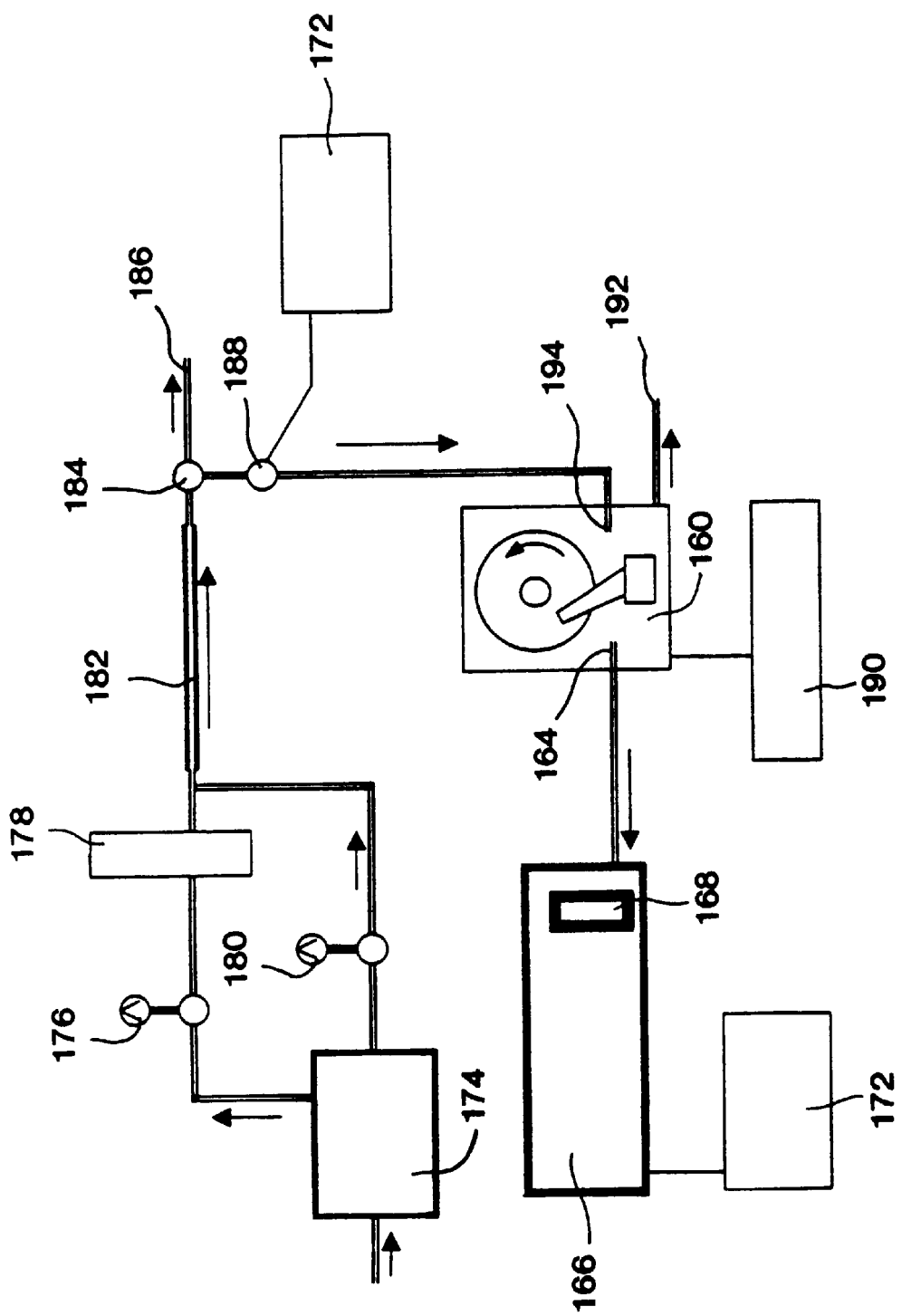

For testing the effectiveness of the recirculation filter function the multi-functional filter was tested in the modified disk drive 160, as schematically illustrated in FIG. 11*b*. The existing breather hole in the drive was left uncovered in order to provide a means for venting 192 any overpressure from the drive and to allow air to enter the drive during periods when the drive environment was being sampled without air being purposefully introduced into the drive. The lid was fastened securely to the base plate. A tube supplying an aerosol mixture of 0.1 μm and 0.3 μm particles was connected to the port in the drive lid which was upstream 194 of the filter based on the direction of disk rotation. A second tube for sampling the internal atmosphere of the drive connected the laser particle counter 166 (LPC) to the port 164 in the drive lid which was downstream of the filter. Sample flow rate out of the drive and through the counter 166 was maintained at 1 cc/sec and sheath flow through the LPC 166 was maintained at 40 cc/sec. Counts of 0.1 μm and 0.3 μm particles were obtained once per second by the LPC 166 and stored on a computer 172 disk drive for later analysis. The test was performed with the drive 160 located in a laminar flow hood fitted with a HEPA filter in the air intake, in order to maintain a controlled test environment with an extremely low ambient particle concentration. A control drive, of the same model and also having had its head suspension assemblies removed, and containing no recirculation filter was tested.

The recirculation filter test consisted of the following sequence: With the drive 160 powered on and clean air passing through the drive, the counts of 0.1 μm and 0.3 μm particles were monitored until a low background count was achieved, typically when 0.3 μm particles were less than 3 counts per second and 0.1 μm particles were less than 10 counts per second. At that time the aerosol was flowed into the drive 160 in order to charge the internal environment with particles. When fully charged and stabilized, counts of 0.1 μm particles were typically between 10000 and 20000 per second and counts of 0.3 μm particles were typically between 3000 and 6500 per second. At this point the flow of aerosol into the drive 160 was halted while sampling of the internal drive atmosphere continued, by drawing out of the drive air which entered through the open breather hole in the base plate as well as any leaks in the lid or base plate. The concentration of 0.1 μm and 0.3 μm particles was observed to drop over time due to the recirculation of air through the drive and the filter, impaction of the particles on surfaces inside the drive, and the gradual exchange of particle-laden air with clean air drawn in through the breather hole. Monitoring of the drive 160 continued until the particle counts dropped to the initial background values observed prior to charging the drive with aerosol.

The data recordings were analyzed by measuring the time required for the counts of 0.1 μm and 0.3 μm particles to fall to 0.1% of their value when the drive was fully charged with particles, defined as the cleanup time. Three individual tests were performed in order to check reproducibility and eliminate error from noise in the background counts. The results from the three tests were averaged to obtain the average cleanup times for 0.1 μm and 0.3 μm particles.

Disk Drive Adsorption Tests

These tests are designed to measure the effectiveness of a multi-functional filter in reducing the concentration of a volatile organic contaminant, toluene, inside a disk drive relative to the concentration of toluene in an inlet stream flowing into the drive. The performance of the multi-functional filter is quantified by calculating the percentage of the inlet concentration of toluene detected in the drive vapor space.

Figure 12:
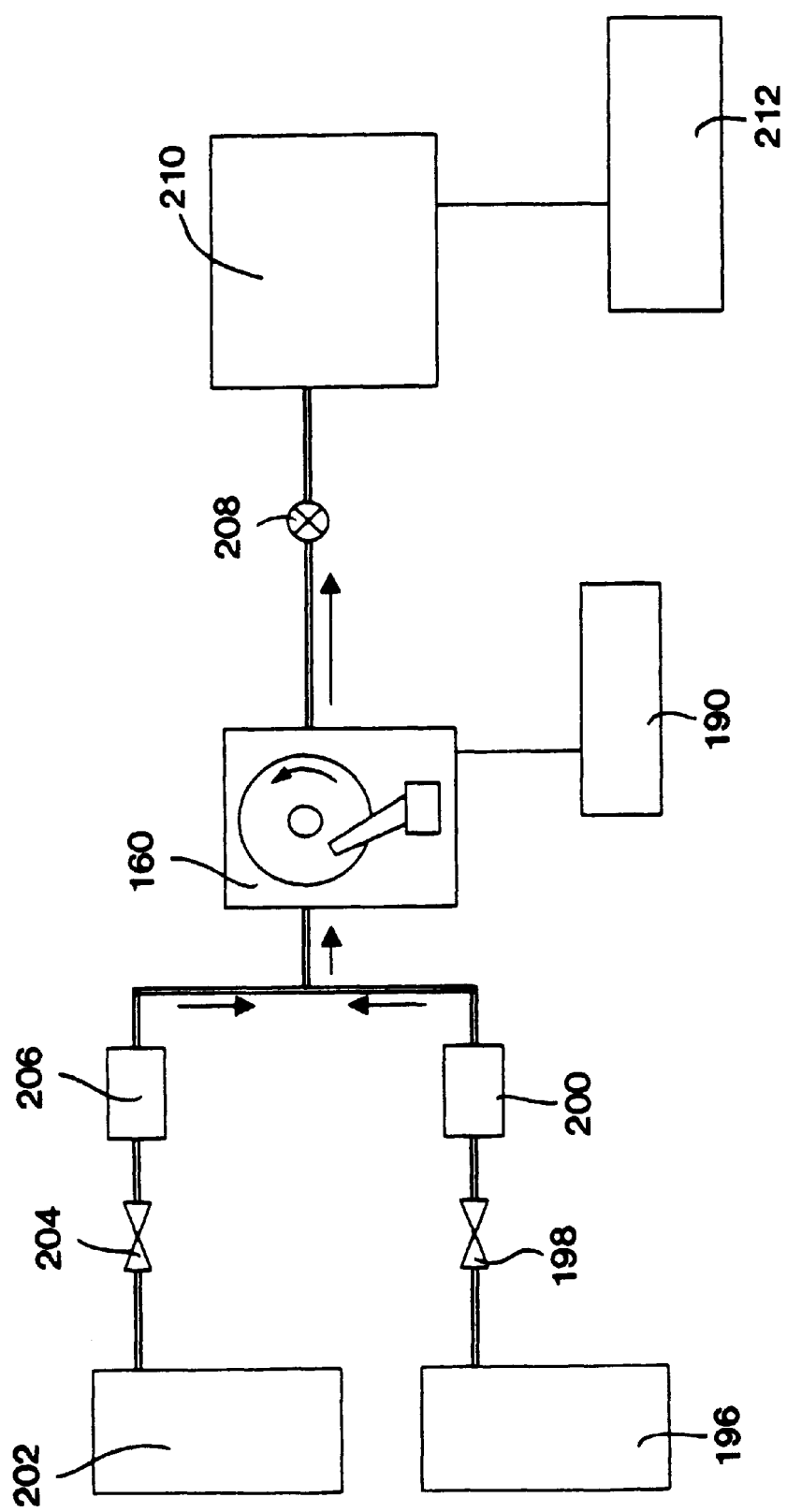

The device was tested in the modified disk drive 160, as shown in FIG. 12. In addition to the two ports made in the drive lid, a 1/16 inch outside diameter rigid TEFLON® tube (obtained from Cole-Parmer Instrument Company, Vernon Hills, Ill.) was inserted from the outside through the bottom of the base plate into the breather hole, to create a third port. The penetration of this tube into the breather hole was limited in such a manner that the end of the tube remained below the internal surface of the base plate. An airtight seal was created around the external juncture between the tube and the base plate using two-component epoxy. Following these further modifications of the drive 160, the filter of the Example was mounted into the base plate as earlier described, such that the hole in the bottom adhesive was located over the breather hole specially made for testing the device. The pre-existing breather hole in the drive was covered with metallized tape. The remaining components were then reassembled into the drive. The drive was resealed, and adhesive tape was used to seal all potential paths for significant air leaks. A control drive of the same model which contained no adsorbent was also tested.

The drive motor was continuously spinning during all testing. The disk drive 160 was purged with clean dry air to verify that initial toluene concentration was 0 ppm. One of the three ports into the drive was capped off. Clean dry air 196 was passed through a pressure regulator 198 and mass flow controller 200 to generate an air stream at a constant volumetric flow rate of 40 ml/min, flowing into one of the two other ports on the drive 160. The remaining port was connected to a flow meter to monitor for any flow loss. The outlet flow into the flow meter was measured to be at least 95% of the inlet stream, and thus the drive was considered adequately sealed for testing.

For testing adsorbent breather functionality of the multi-functional filter, 100 ppm toluene in nitrogen 202 was passed through a pressure regulator 204 and mass flow controller 206, and mixed with clean dry air to generate a room temperature stream of 25 ppm toluene in air. This toluene stream was flowed directly into the part, through the tube adhered to the breather hole, at a volumetric flow rate of 40 ml/min. One of the two ports in the lid was closed with a cap. Rigid TEFLON® tubing was used to connect the second port in the lid via a sampling valve 208 to a gas chromatograph equipped with a flame ionization detector (FID) 210 to monitor toluene concentration inside the drive. The data recordings were collected on a personal computer 212 and analyzed by calculating a percentage from the ratio of the sampled concentration and a nominal inlet concentration of 25 ppm over the duration of the test.

For testing the adsorbent recirculation functionality of the filter, a cap was used to seal the tube entering the breather hole over which the device was situated. The pre-existing breather hole in the drive 160 remained sealed with metallized tape. A room temperature stream of 25 ppm toluene in clean dry air was then flowed into the drive 160 through the port in the lid which was upstream of the test sample, at a volumetric flow rate of 40 ml/min. The second port in the lid was connected to the FID 210 with rigid TEFLON® tubing, in order to monitor toluene concentration inside the drive. The data were analyzed by calculating a percentage from the ratio of the sampled concentration and a nominal inlet concentration of 25 ppm over the duration of the test.

Passive Adsorption Test

This test is designed to measure the initial adsorption uptake of a volatile organic contaminant, toluene, by an adsorbent filter under static conditions, i.e., adsorption under constant gas/vapor concentration without significant convective gas flow. The performance of the adsorbent filter is quantified in terms of an adsorption rate, which is the average weight increase of the adsorbent filter per unit time.

Figure 13:
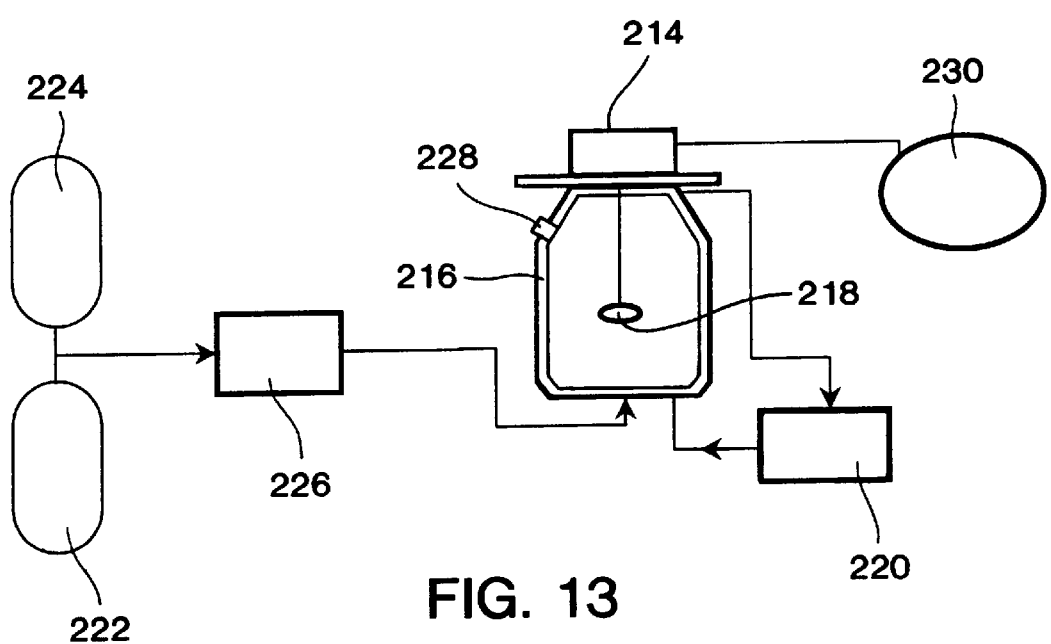

For measuring the passive adsorption uptake, the rigid multi-functional filter of the Example was adhered to a small sheet of plastic which covered the entire bottom surface, such that the entrance to the diffusion tube was completely sealed off. A small hole had been punched in a portion of the plastic sheet protruding out from under the filter, which was used to suspend the filter from a hook attached to the microbalance 214, shown in FIG. 13. The glass sample chamber 216 was sealed around the sample 218. Water from a constant temperature bath 220 was circulated through a jacket surrounding the sample chamber 216 until the system reached a steady temperature of 25° C. The chamber 216 was then flushed with clean dry air 222 until the microbalance 214 recorded a constant weight, signifying the elimination of moisture from the sample 218.

To start the vapor adsorption process, the microbalance 214 was tared, and a mixture of toluene 224 and air 222 was passed through a flow controller 226 and allowed to flow into the chamber 216 from below and out through a vent 228 at the top. The toluene stream had a flow rate of 1 liter/min and a concentration of 25 ppm by volume. Based on this volumetric flow rate and the cross-sectional area of the sample chamber 216, the linear flow velocity was calculated to be around 0.9 mm/second. This linear flow velocity was chosen based on the assumption that it would be sufficiently low to prevent convective flow through the device, which may possibly have an impact on the adsorption rate. The weight of the device was monitored for several hours and recorded using a computer-based data acquisition system 230. The data recordings were analyzed by performing a linear regression through the weight data for the device vs. time. The resulting slope provides a measure of the passive adsorption rate through the openings in the filter, which would be in direct fluid communication with the interior of a disk drive.

Frazier Number Air Permeability Test

Air permeability was measured by clamping a test sample in a circular gasketed flanged fixture 5.5 inches in diameter (23.76 square inches in area). The upstream side of the sample fixture was connected to a flow meter in line with a source of dry compressed air. The downstream side of the sample fixture was open to the atmosphere.

Testing was accomplished by applying an air pressure of 0.5 inches of water to the upstream side of the sample and recording the flow rate of air passing through the in-line flow meter (a ball-float rotameter).

Results are reported in terms of Frazier Number which has units of cubic feet/minute/square foot of sample at 0.5 inches of water pressure.

Burst Strength-Ball Burst Test

The test method and related sample mounting apparatus were developed by W. L. Gore & Associates, Inc. for use with a Chatillon Test Stand. The test is a mechanical measurement of the burst strength of materials such as fabrics (woven, knit, nonwoven, etc.), porous or nonporous plastic films, membranes, sheets, etc., laminates thereof, and other materials in planar form.

A specimen is mounted taut, but unstretched, between two annular clamping plates (inside diameter—3 inches). A metal rod having a polished steel 1" diameter ball-shaped tip applies a load against the center of the specimen in the Z-direction (normal to the X-Y planar directions). The rod is connected at its other end to an appropriate Chatillon force gauge mounted in a Chatillon Materials Test Stand, Model No. TCD-200. The load is applied at the rate of 10 inches per minute until failure of the specimen occurs. The failure (tearing, burst, etc.) may occur anywhere within the clamped area. Results are reported as the maximum applied force before failure.

Testing is done at ambient interior temperature and humidity conditions, generally at a temperature of 70–72° F. and relative humidity of 45–55%. Materials to be tested are not conditioned at specific temperature and humidity conditions prior to testing.

Particle Filtration Efficiency

Membrane filtration efficiency testing was performed using dioctyl phthalate aerosol on a TSI CertiTest® Model 8160 Automated Filter Tester (TSI Incorporated, St. Paul, Minn.), according to the procedure specified in the CertiTest® Model 8160 Automated Filter Tester Operation and Service Manual. The sample test area was 77.8 $cm^2$ and face velocity was 5.32 cm/sec.

Without intending to limit the scope of the present invention, the following example illustrates how the present invention may be made and used.

EXAMPLE

A device was constructed and tested which combined all the functions of particulate recirculation filter, particulate breather filter, diffusion tube, and adsorbent, the adsorbent acting in both a passive mode and an active mode in concert with the recirculation and breather filters.

The device was assembled around a rigid plastic frame, depicted in FIG. 1 and FIGS. 2a–2c, which was designed for use in a 3.5" form factor disk drive (Model Number 90845D4, Maxtor Corporation, Milpitas, Calif.). This frame was obtained from Mack Prototype, Inc, Shelton, Conn., where it was produced by means of stereolithography from CIBATOOL® photocurable resin (Ciba Specialty Chemicals Corporation, Los Angeles, Calif.).

The front face of the frame, shown facing to the right in the side view of FIG. 2b, was of rectangular shape having overall dimensions of 14.0 mm width by 12.0 mm height. This face was divided into three primary areas extending across the entire width of the frame, these being, first, an upper opening of 5.0 mm height, second, a lower opening of 6.0 mm height, these latter dimensions including the height of the opening plus surrounding framework of plastic, and, third, a tab or ridge along the bottom edge of 1.0 mm height. The plastic frame contained a raised ridge of 0.3 mm depth along the entire perimeter of the front and rear openings, as shown in the side view of FIG. 2b. The lower opening in the front provided entry into a chamber, also shown in FIG. 2b, extending 10.0 mm deep as measured perpendicular to the front face. As viewed from below, as in FIG. 2c, the shape of the chamber was that of a parallelogram whose sides made an angle of 45 degrees with the front and rear faces of the frame. The tab along the bottom of the front face was of 1.0 mm depth, designed to mate with a recessed slot in the drive baseplate to improve alignment and restrict movement of the device when mounted in the drive. The bottom surface of the plastic frame contained a curvilinear recess of 28.6 mm total length, 0.8 mm depth, and 0.8 mm width forming a diffusion tube when mated to the interior surface of the drive baseplate.

The interior surfaces curved inward from either the front or rear openings of the chamber, forming a slight constriction midway into the chamber with respect to these openings. The front and rear openings had an actual area of 54.2 mm$^2$ whereas the actual cross-sectional area of the throat at the center of the chamber was 32.8 mm$^2$, representing an approximately 40% reduction in cross-sectional area. The passage from the end of the diffusion tube into the chamber consisted of a circular hole of 0.8 mm diameter passing through the bottom surface. This hole was located midway between the front and rear openings and thus along the line of minimum cross-sectional area.

Assembly of the device proceeded via the attachment to the plastic frame of several layers of adhesive and filtration media and incorporation of the adsorbent. The first of these steps consisted of punching a circular hole of ⅛ inch diameter through a sheet of double-sided pressure sensitive adhesive (PSA) tape. The tape consisted of a polyester film carrier of 0.002 inch (0.05 mm) thickness covered on each side by a 0.001 inch thick (0.025 mm) layer of permanent high temperature, low outgassing, acrylic PSA, each of which was covered by a removable polyester liner. A piece of this adhesive in the shape of a parallelogram enclosing and just slightly larger than the hole was cut using a single edge razor blade. One of the liner layers was then removed, and the adhesive was covered with a layer of microporous filtration media which consisted of expanded polytetrafluoroethylene (ePTFE) membrane produced according to the method taught in U.S. Pat. No. 5,814,405 by Branca et al. This membrane had a permeability to air flow, as characterized by the Frazier Number, of 29 cubic feet per minute per square foot of sample at an air pressure of 0.5 inches of water, a ball burst of 6 pounds, and a thickness of 0.0008 inches. The excess membrane was trimmed along the edges of the adhesive using a razor. The second liner was removed from the underside of the adhesive, and the piece of adhesive containing the membrane was placed inside the chamber in the plastic frame such that the exposed adhesive layer was in contact with the floor of the chamber and the hole in the adhesive covered by the ePTFE membrane completely encircled the hole in the lower surface of the chamber. Once in place, the adhesive bond was improved by applying downward pressure to the membrane-covered adhesive surrounding the hole using a smooth flat object.

The next step involved lightly tracing the bottom profile of the plastic frame onto a sheet of the same adhesive tape used in the previous step, using a single-edged razor blade to perform the trace and subsequently cut through the adhesive according to the trace. A circular hole of ⅛ inch diameter was punched through this adhesive piece in the corner corresponding to the entrance to the diffusion tube from the breather hole in the drive baseplate. One layer of liner was removed and the adhesive attached to the bottom surface of the plastic frame such that the hole in the adhesive layer completely encircled the entrance to the diffusion tube and the adhesive otherwise completely covered the bottom surface of the frame. Excess adhesive was trimmed along the outer edges of the frame using a razor.

In order to produce a smooth surface for the adhesion of filtration media to the front openings of the plastic frame, a sheet of 400 grit abrasive cloth was used to eliminate protrusions from the front face of the frame. A thin coating of cyanoacrylate adhesive (PRISM® 408, Loctite Corporation, Rock Hill, Conn.) was applied along the periphery of both the upper and lower openings on the front face of the frame. Over these openings was laid, with the membrane in contact with the plastic frame, a first sheet of laminate consisting of ePTFE membrane laminated to an expanded polypropylene mesh (Delnet RC0707-20P, Applied Extrusion Technology, Inc., Middletown, Del.). The membrane, produced according to the method taught in 5,814,405 by Branca et al., had a Frazier Number of 112 (cubic feet per minute per square foot of sample at an air pressure of 0.5 inches of water), a ball burst of 1.4 pounds, a thickness of 0.0004 inches, and a filtration efficiency for 0.1 μm diameter particles of 45.8% at a face velocity of 5.32 cm/s. After fusion bonding the membrane to the Delnet, the laminate had a Frazier Number of 37 when oriented with the membrane facing upstream and a Frazier Number of 47 when oriented with the Delnet facing upstream. The laminate was pressed gently down onto the edges of the frame using a gloved finger, and further adhered to the frame by applying a second thin line of the same adhesive over the polypropylene screen along the edges of the openings. After the adhesive had dried and a strong bond had formed, the excess laminate was trimmed from the edges of the openings using a single-edged razor blade.

A layer of electret electrostatic filter media (polypropylene and modacrylic, 30 g/m$^2$ specific weight) bonded to a polypropylene spun bond backer (15 g/m$^2$ specific weight) (Technostat, All Felt, Ingleside, Ill.) was cut to fit into the chamber in the plastic frame. This piece was inserted through the open end of the chamber such that the backer was adjacent to the ePTFE membrane which had been glued to the opening. The chamber was partially filled with activated carbon beads (0.6 mm average diameter, 1200 m$^2$/g specific surface area, 0.57 cc/g pore volume) having a total weight of 110 mg, as determined by weighing of the frame before and after filling. A second layer of electret filter media identical to the first was inserted through the open end of the chamber such that the backer layer faced outwards toward the open rear opening.

A thin coating of cyanoacrylate adhesive was applied along the periphery of the rear opening of the frame. Over this opening was laid, with the membrane in contact with the plastic frame, a second sheet of laminate of the same type as that earlier used to cover the front openings. The strength of the bond was improved by applying a second thin line of the same adhesive over the polypropylene screen along the edges of the openings. When the adhesive had dried the excess laminate was trimmed from the edges of the openings using a single-edged razor blade. In order to further reduce the probability of the laminates decohering from the plastic frame, a final light coating of cyanoacrylate adhesive was applied to the edges of the laminates over the front and rear faces, restricting coverage of the adhesive to the areas covering the plastic edges of the frame.

Performance Test Results

Tests were conducted to verify that each of the intended functions was operative in the integrated, multi-function device of this Example. Specifically, tests were made of the performance of the Example as a particulate breather filter, particulate recirculation filter, adsorbent breather filter, adsorbent recirculation filter, and passive adsorbent filter. The diffusion tube was not specifically tested, as its role in delaying equilibration of vapor concentrations interior and exterior to the drive are well established in the art, and the design of the present invention readily permits incorporation of a diffusion tube having a broad range of possible dimensions.

Breather Filter Test Results

The effectiveness of the Example as a particulate breather filter was evaluated by sampling the drive atmosphere while the drive was in an environment containing a high concentration of particles, once with the drive motor off and then again with the motor on. In the former test the reduction of particle counts in the drive is due primarily to the breather filter as well as particle impaction on surfaces in the drive and sampling apparatus, as there is no recirculating flow inside the drive. Results are shown in the following table, together with results for a control drive with an electret recirculation filter but no breather filter. It is clear from the particle removal efficiencies that inclusion of the multi-functional filter of this Example provides a substantial benefit to the cleanliness of the internal drive environment.

| Drive (Motor Off) | Run 1 | Run 2 | Run 3 | Average |
|---|---|---|---|---|
| | % efficiency, 0.1 µm particles | | | |
| Drive with Device of Example | 93.5083 | 92.4316 | 92.3458 | 92.7619 |
| Drive with Recirculation Filter, no Breather Filter | 28.2037 | 23.1783 | 16.2720 | 22.5514 |
| | % efficiency, 0.3 µm particles | | | |
| Drive with Device of Example | 94.9219 | 94.1000 | 94.1410 | 94.3876 |
| Drive with Recirculation Filter, no Breather Filter | 30.7003 | 27.3429 | 19.5682 | 25.8705 |

In the breather filter tests with the drive motor spinning, additional particle removal is effected by the recirculation filter in both the test and the control drives. Nevertheless, as may be seen from the data in the following table, the recirculation filter alone in the control drive is unable to match the overall cleanliness level achieved by the multi-functional filter device of this Example. This demonstrates the effective operation of both the particulate breather and recirculation filter functions in the Example.

| Drive (Motor On) | Run 1 | Run 2 | Run 3 | Average |
|---|---|---|---|---|
| | % efficiency, 0.1 µm particles | | | |
| Drive with Device of Example | 97.8418 | 97.7266 | 97.9405 | 97.8363 |
| Drive with Recirculation Filter, no Breather Filter | 87.7152 | 89.3290 | 90.2864 | 89.1102 |
| | % efficiency, 0.3 µm particles | | | |
| Drive with Device of Example | 98.3716 | 98.1532 | 98.4501 | 98.3250 |
| Drive with Recirculation Filter, no Breather Filter | 89.3114 | 91.1094 | 91.4681 | 90.6296 |

Recirculation Filter Test Results

Figure 14:
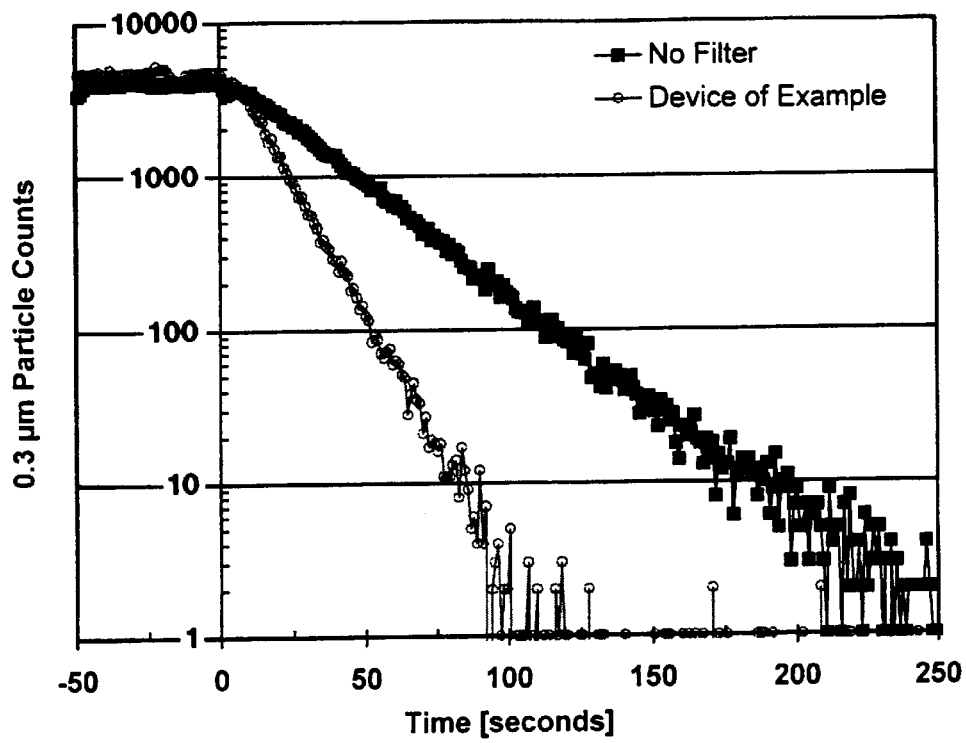
FIGS. 14–17 are graphs showing the test performance of the rigid filter device of the Example.

Further demonstration of the effectiveness of the recirculation filter function in the Example is provided by a direct measure of the time required to reduce particle counts in a drive from an elevated initial state. Results of this test are presented in the following table, along with data obtained for a control drive not possessing a recirculation filter. The measured cleanup times for the drive containing the Example are less than half of that for the control drive, confirming the effectiveness of its recirculation filter function. A sample run for each drive has been plotted in FIG. 14, clearly illustrating the faster decay rate for the drive containing the multi-functional filter of the Example.

| Drive | Run 1 | Run 2 | Run 3 | Average |
|---|---|---|---|---|
| | Cleanup time [seconds] - 0.1 µm | | | |
| Drive with Device of Example | 99 | 103 | 100 | 101 |
| Drive with No Filter | 208 | 225 | 219 | 217 |
| | Cleanup time [seconds] - 0.3 µm | | | |
| Drive with Device of Example | 89 | 87 | 88 | 88 |
| Drive with No Filter | 203 | 198 | 200 | 200 |

Adsorbent Breather Filter Test Results

Figure 15:
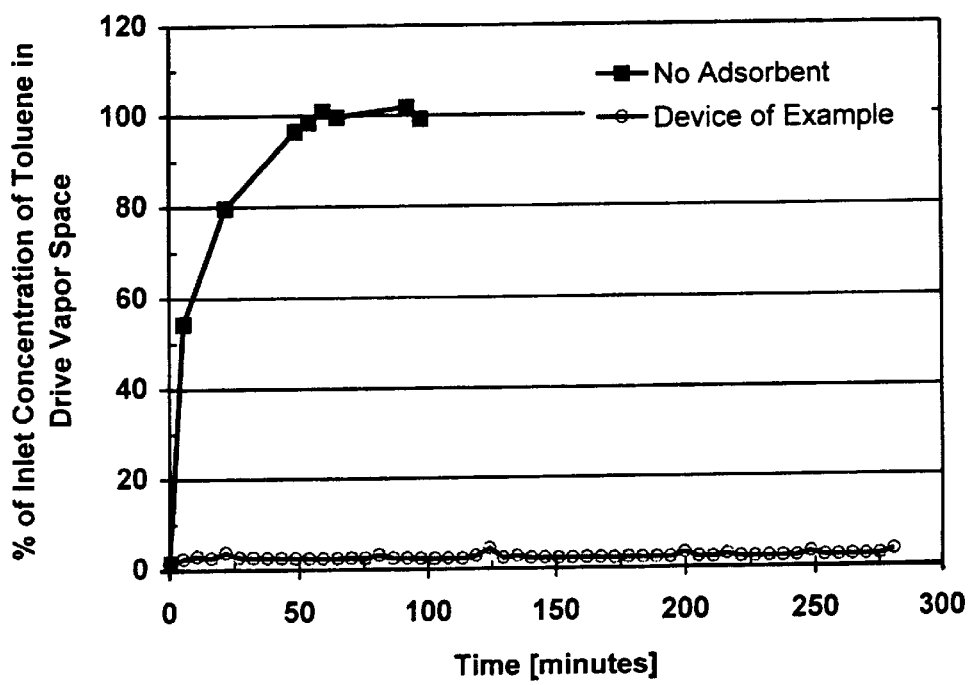

The performance of the multi-functional filter device of this Example as an adsorbent breather filter was evaluated by passing a toluene/air mixture directly into the breather hole and measuring toluene concentration in the drive. The results are presented in FIG. 15, which shows the drive with the device of this Example maintaining a steady and low toluene concentration, of about 2.5% of the inlet concentration, throughout the duration of the test which was over three-and-a-half hours. The concentration in the control drive, which contained a breather filter with no adsorbent, reached 100% of the inlet concentration within an hour. These results demonstrate the effectiveness of the multi-functional filter device of this Example as an adsorbent breather filter, preventing the entry of volatile contaminants into the drive.

Adsorbent Recirculation Filter Test Results

Figure 16:
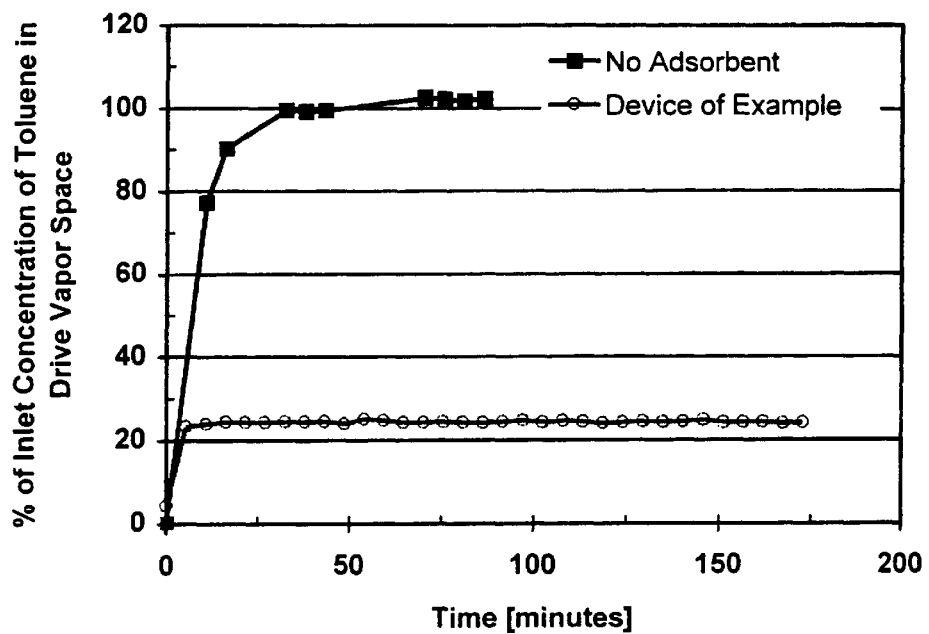

The performance of the multi-functional filter device of this Example as an adsorbent recirculation filter was evaluated by passing a toluene/air mixture into the drive through the upstream port in the lid and measuring toluene concentration in the drive. The results are presented in FIG. 16, which shows the drive with the device of this Example maintaining a steady and low toluene concentration, of about 24% of the inlet concentration, throughout the duration of the test which was nearly three hours. The concentration in the control drive, which did not contain any adsorbent, approached 100% of the inlet concentration within about half-an-hour. These results demonstrate the effectiveness of the multi-functional filter device of this Example as an adsorbent recirculation filter, reducing the concentration of volatile contaminants which have found their way into the drive.

Passive Adsorption Test Results

Figure 17:
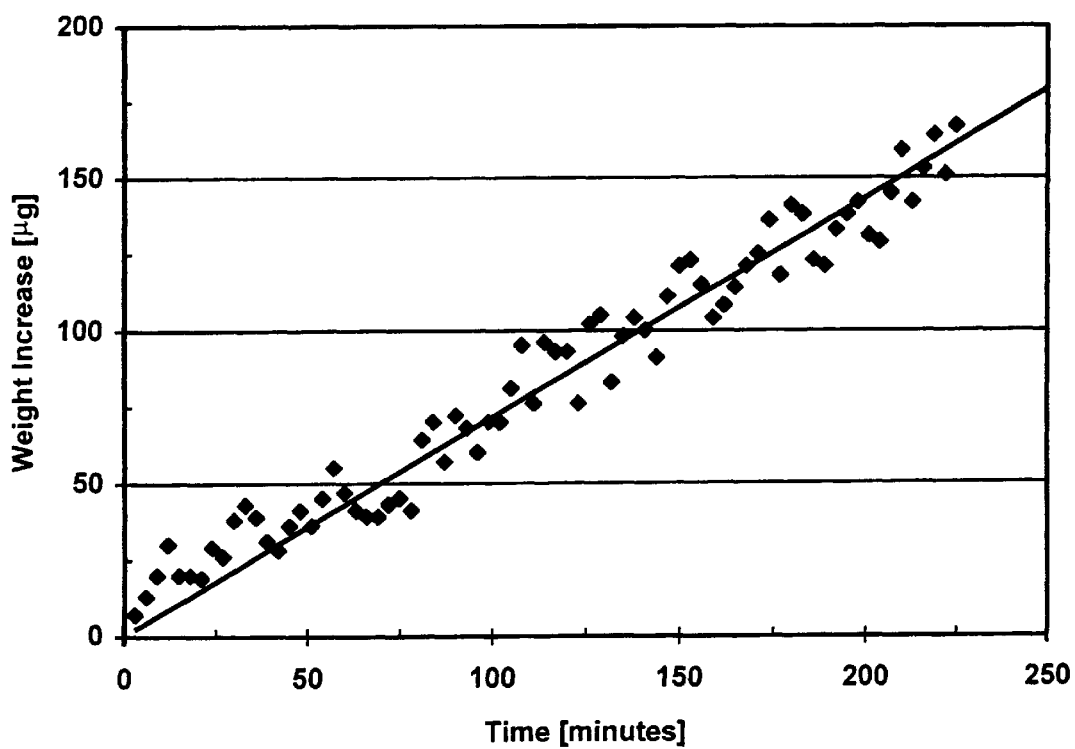

The performance of the multi-functional filter device of this Example as a passive adsorbent filter was evaluated by passing a toluene/air mixture at a low linear flow velocity into a sealed chamber and monitoring the weight of the device over time. The results are presented in FIG. 17, which shows the device of this Example maintaining an approximately constant rate of weight increase, of about 0.72 µg/minute, throughout the duration of the test which was nearly four hours. These results demonstrate the effectiveness of the multi-functional filter device of this Example as a passive adsorbent filter, capable of removing volatile contaminants from an environment when there is negligible convective air flow through the filter.

We claim:

1. A filter adapted for removing particulate and vapor phase contaminants from an enclosure comprising:
    a rigid frame comprising a first end having an opening and a second end having an opening and at least one side, the rigid frame defining a volume therein;
    an extension extending adjacent to said rigid frame, the extension including at least one opening therein;

at least one first filter media covering the opening in the first end and at least one second filter media covering the opening in the second end, thereby enclosing said volume within the rigid frame to form a chamber;

at least one adsorbent located within the chamber; and at least one third filter media covering the at least one opening in the extension.

2. The filter of claim 1, further comprising an inlet hole in the at least one side.

3. The filter of claim 2, further comprising a filter media covering the inlet hole.

4. The filter of claim 2, further comprising a diffusion tube aligned over said inlet hole.

5. The filter of claim 2, wherein said filter further comprises a gasket surrounding the inlet.

6. The filter of claim 2, further comprising an adhesive for attaching said filter to said enclosure surrounding said inlet hole.

7. The filter of claim 1, wherein said rigid frame comprises at least one material selected from the group consisting of polycarbonate, polypropylene, acrylic, epoxy resin, aluminum, stainless steel, brass, alumina, glass and reinforced epoxy resin.

8. The filter of claim 7, wherein said rigid frame comprises polycarbonate.

9. The filter of claim 1, wherein said at least one side comprises multiple sides.

10. The filter of claim 1, wherein said at least one side includes an opening which is covered by at least one filter media.

11. The filter of claim 10, wherein said at least one filter media comprises at least one material selected from the group consisting of papers, membranes, nonwovens, scrims and cast polymeric membranes.

12. The filter of claim 10, wherein said at least one filter media comprises at least one material selected from the group consisting of expanded polytetrafluoroethylene, polypropylene, polyethylene and polyester.

13. The filter of claim 10, wherein said at least one filter media comprises an electret filter media.

14. The filter of claim 1 wherein said extension is contiguous with and extends in a plane parallel to at least one of the first end and the second end.

15. The filter of claim 1, wherein said first filter media, said second filter media and said third filter media have the same properties.

16. The filter of claim 1, wherein said first filter media, said second filter media and said third filter media have different properties.

17. The filter of claim 1, wherein said at least one adsorbent comprises at least one material selected from the group consisting of silica gel, activated carbon, activated alumina, clays and molecular sieves.

18. The filter of claim 1, wherein said at least one adsorbent comprises at least one material selected from the group consisting of potassium permanganate, potassium carbonate, potassium iodide, calcium carbonate, calcium sulfate, sodium carbonate, sodium hydroxide, potassium hydroxide, sodium iodide, calcium hydroxide and powdered silver.

19. The filter of claim 1, wherein said at least one first filter media comprises at least material selected from the group consisting of papers, membranes, nonwovens, scrims and cast polymeric membranes.

20. The filter of claim 1, wherein said at least one first filter media comprises at least one material selected from the group consisting of expanded polytetrafluoroethylene, polypropylene, polyethylene and polyester.

21. The filter of claim 1, wherein said at least one first filter media comprises an electret filter media.

22. The filter of claim 1, wherein said at least one second filter media comprises at least material selected from the group consisting of papers, membranes, nonwovens, scrims and cast polymeric membranes.

23. The filter of claim 1, wherein said at least one second filter media comprises at least one material selected from the group consisting of expanded polytetrafluoroethylene, polypropylene, polyethylene and polyester.

24. The filter of claim 1, wherein said at least one second filter media comprises an electret filter media.

25. The filter of claim 1, wherein said at least one third filter media comprises at least material selected from the group consisting of papers, membranes, nonwovens, scrims and cast polymeric membranes.

26. The filter of claim 1, wherein said at least one third filter media comprises at least one material selected from the group consisting of expanded polytetrafluoroethylene, polypropylene, polyethylene and polyester.

27. The filter of claim 1, wherein said at least one third filter media comprises an electret filter media.

28. The filter of claim 1, further comprising a gasket attached to said filter for sealing the enclosure.

29. The filter of claim 1, wherein said rigid frame includes a venturi within said chamber.

30. The filter of claim 1, wherein said rigid frame further comprises a vane adapted for deflecting air flow within the enclosure.

31. The filter of claim 1, further comprising an attachment means for attaching said filter to said enclosure selected from the group consisting of an adhesive, a drop-in-place assembly, a lock-in-place assembly and a pressure fit gasket assembly.

32. An article comprising a filter adapted for removing contaminants from an environment comprising:

a rigid frame having four sides, a first open end and a second open end, the rigid frame defining a volume therein;

an extension extending in a parallel plane to at least one of the first open end and the second open end, the extension having an opening therein;

at least one first filter media covering the first open end and at least one second filter media covering the second open end, thereby enclosing the volume within the rigid frame to form a chamber;

at least one adsorbent located within the chamber;

at least one third filter media covering the opening in the extension; and an inlet in one of the four sides with a diffusion tube located over the inlet;

whereby when the filter is located within the enclosure so that the diffusion tube lines up with a breather vent hole in the enclosure, the filter is capable of removing contaminants from air entering the environment and contaminants which are present within the enclosure.

33. A filter adapted for removing particulate and vapor phase contaminants from an enclosure comprising:

a rigid three-dimensional frame having substantially the form of a parallelogram comprising: a first open end and a second open end, each opening having a top edge, a bottom edge and two side edges; a bottom, two sides each having an opening therein and a top having an opening therein connecting the two open ends; and a frame section having an opening therein bisecting the rigid frame and extending from the lower edge of the first open end to the upper edge of the second open end;

at least one first filter media covering the first open end and at least one second filter media covering the second open end;

at least one third filter media covering the opening in the bisecting frame section and at least one fourth filter media covering at least a portion of the sides which connect the side edges of the open ends so as to create a chamber below the bisecting frame section; and at least one adsorbent located within the chamber.

34. The filter of claim 33, further comprising an inlet hole in the bottom.

35. The filter of claim 34, further comprising a filter media covering the inlet hole.

36. The filter of claim 34, further comprising a diffusion tube aligned over said inlet hole.

37. The filter of claim 34, wherein said filter further comprises a gasket surrounding the inlet.

38. The filter of claim 34, further comprising an adhesive for attaching said filter to said enclosure surrounding said inlet hole.

39. The filter of claim 33, wherein said rigid frame comprises polycarbonate.

40. The filter of claim 33, wherein said bottom includes an opening which is covered by at least one filter media.

41. The filter of claim 33, wherein said first filter media, said second filter media, said third filter media and said fourth filter media have the same properties.

42. The filter of claim 33, wherein said first filter media, said second filter media, said third filter media and said fourth filter media have different properties.

43. The filter of claim 33, further comprising an attachment means for attaching said filter to said enclosure selected from the group consisting of an adhesive, a drop-in-place assembly, a lock-in-place assembly and a pressure fit gasket assembly.

44. A filter adapted for removing particulate and vapor phase contaminants from an enclosure comprising:

a rigid frame comprising a first end with an opening and a second end with an opening and at least one side, the rigid frame defining a volume therein;

an extension extending adjacent to said rigid frame, the extension including at least one opening therein;

at least one first filter media covering the opening in the first end;

at least one adsorbent located within at least a portion of said volume;

at least one second filter media covering the adsorbent to contain the adsorbent within at least a portion of said volume; and at least one third filter media covering the at least one opening in the extension.

45. The filter of claim 44, wherein said rigid frame comprises at least one material selected from the group consisting of polycarbonate, polypropylene, acrylic, epoxy resin, aluminum, stainless steel, brass, alumina, glass and reinforced epoxy resin.

46. The filter of claim 44, wherein said rigid frame comprises polycarbonate.

47. The filter of claim 44, wherein said first filter media, said second filter media and said third filter media have the same properties.

48. The filter of claim 44, wherein said first filter media, said second filter media and said third filter media have different properties.

49. The filter of claim 44, wherein said at least one adsorbent comprises at least one material selected from the group consisting of silica gel, activated carbon, activated alumina, clays and molecular sieves.

50. The filter of claim 44, wherein said at least one adsorbent comprises at least one material selected from the group consisting of potassium permanganate, potassium carbonate, potassium iodide, calcium carbonate, calcium sulfate, sodium carbonate, sodium hydroxide, potassium hydroxide, sodium iodide, calcium hydroxide and powdered silver.

51. The filter of claim 44, which further includes at least one means for altering the flow of air through the filter.

52. The filter of claim 51, wherein said means for altering the flow of air comprises a venturi on said rigid frame.

53. The filter of claim 51, wherein said means for altering the flow of air comprises a vane on said rigid frame.

54. The filter of claim 51, wherein said means for altering the flow of air comprises a projection on said rigid frame.

* * * * *